June 30, 1936.  J. E. PADGETT  2,045,611
AUTOMATIC POWER TRANSMITTING MECHANISM
Filed July 17, 1933  5 Sheets-Sheet 1

Joseph E. Padgett
Strauch & Hoffman
Attorneys

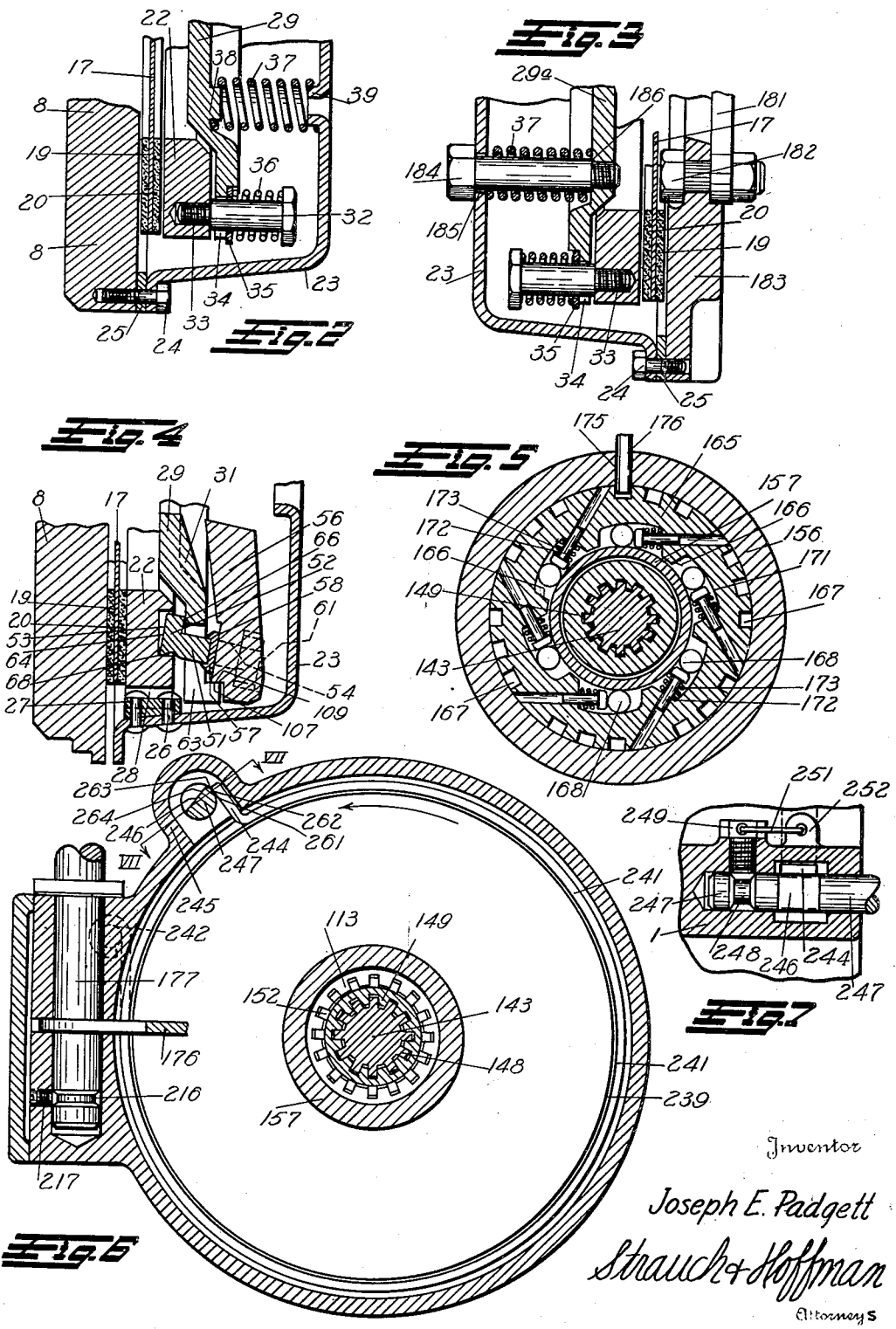

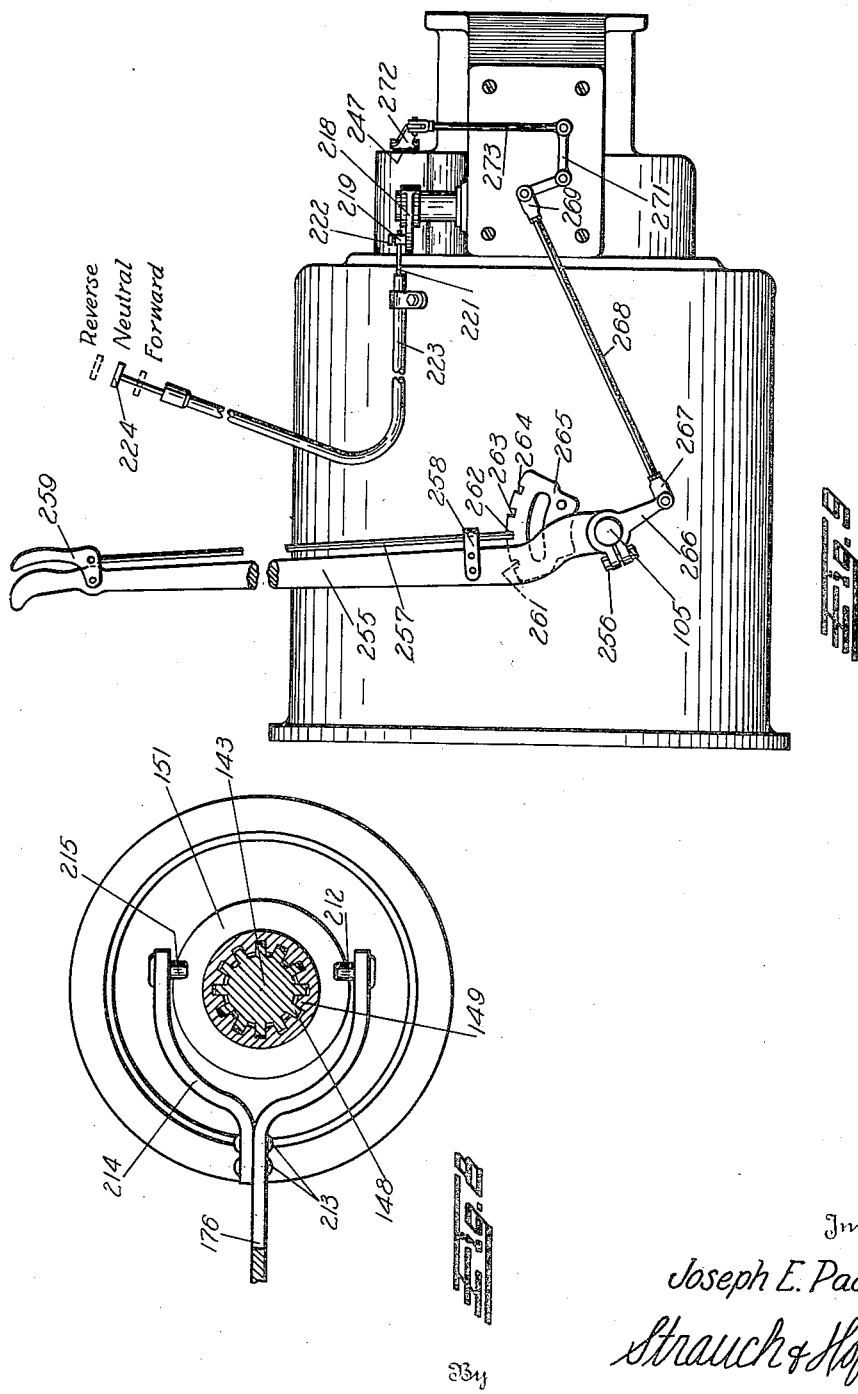

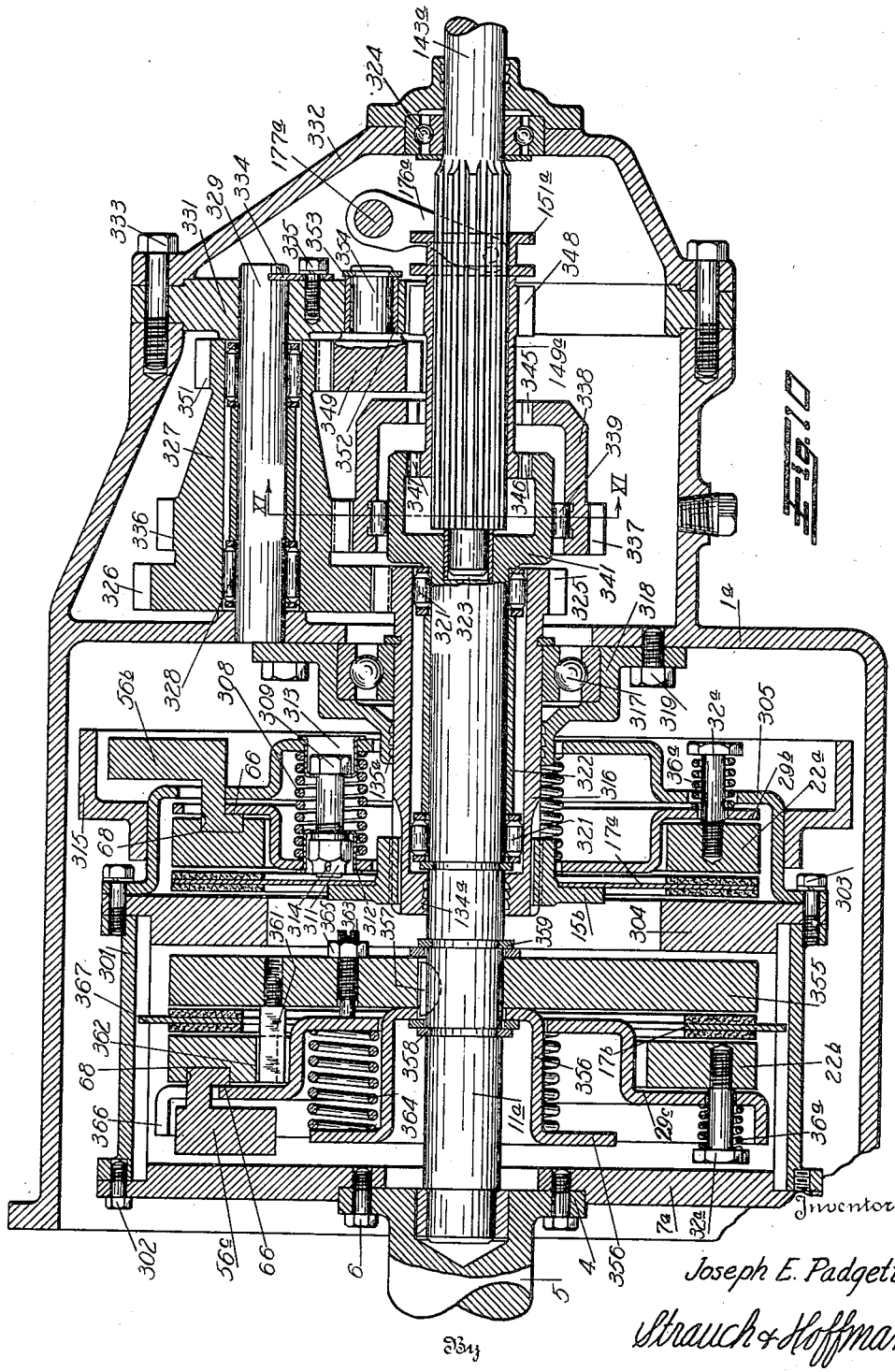

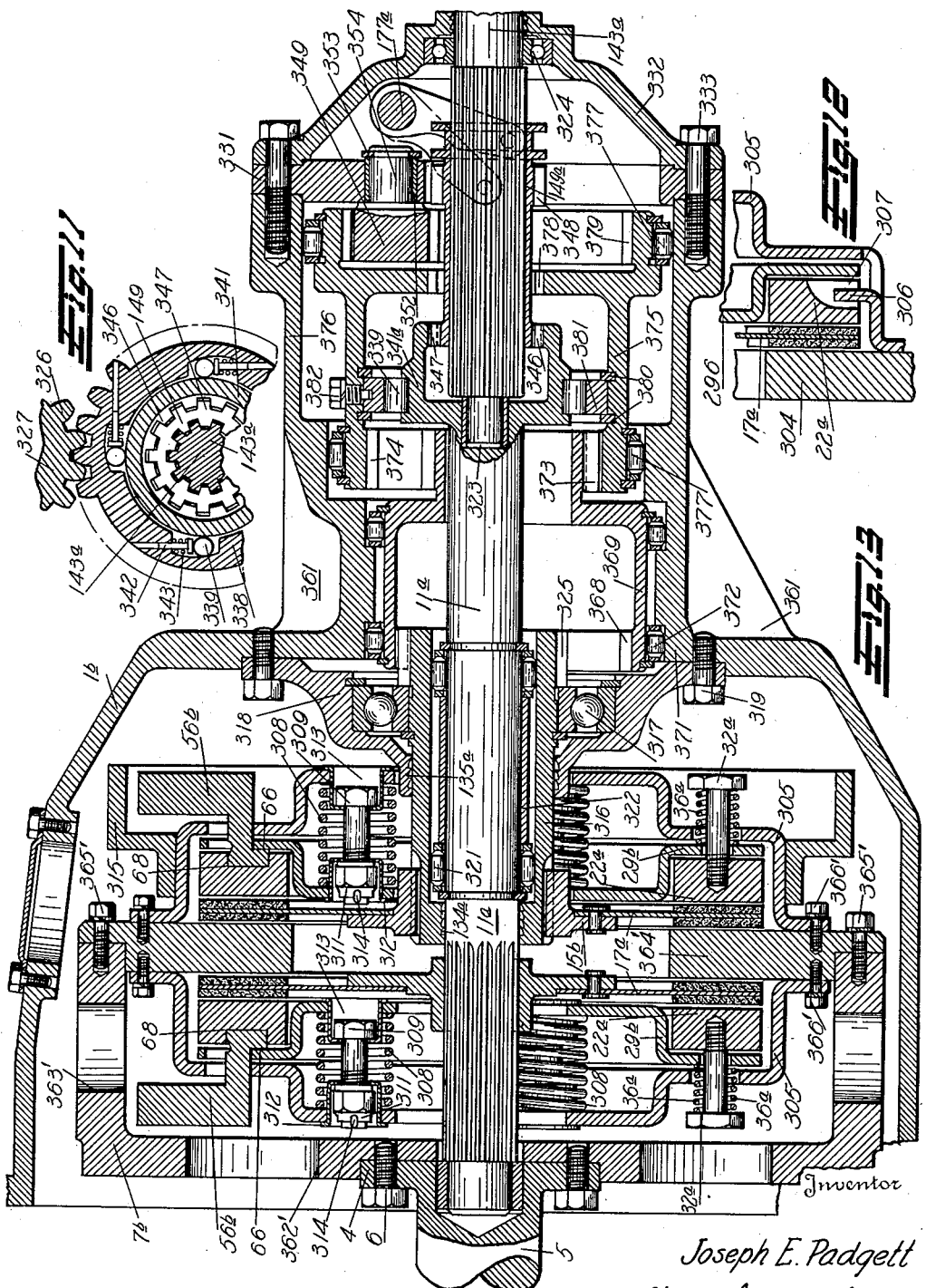

Patented June 30, 1936

2,045,611

UNITED STATES PATENT OFFICE 2,045,611

AUTOMATIC POWER TRANSMITTING MECHANISM

Joseph E. Padgett, Toledo, Ohio

Application July 17, 1933, Serial No. 680,857

37 Claims. (Cl. 74—260)

The present invention relates to automatic mechanisms for transmitting power from a driving member to a driven member, which are adapted for a wide variety of automotive and industrial drives.

More particularly, the present invention relates to automatic power transmitting mechanisms in which power is delivered from the driving to the driven member with sufficient torque amplification at relatively low driven speeds to pick up the load and to accelerate the driven shaft until it is rotating at a speed where the prime mover can drive the load without the aid of torque multiplication, when the driven member is automatically coupled to the driving member.

In my co-pending applications, Serial Number 643,744, filed November 21, 1932, and Serial Number 667,869, filed April 25, 1933, I have disclosed combined slipping drive and torque multiplying automatic transmission mechanisms wherein the prime mover is permitted to operate at a sufficiently high speed to apply substantial torque to the torque multiplying mechanism at all times when the speed of the driven member is below the point where the prime mover can handle the load in direct drive, in combination with mechanism operative to automatically establish direct drive between the driving and driven members when the driven member is operating at a speed sufficient to enable the prime mover to handle the load without torque multiplication. These mechanisms are simple in design, highly efficient in all phases of their operation, low in cost and compact, perform the manifold functions peculiar to automatic or similar drives, and deliver the power required well within the space and size limits allotted to modern automotive transmission mechanisms. Because of the fact that they permit comparatively high speed prime mover operation during starting operations, and in addition to being highly useful for automotive drives, they permit the adoption of efficient high speed simplified electrical motors, steam turbines, and the like as prime movers for electrically and steam driven vehicles and industrial drives such as locomotive, elevator, drier, conveyor, crusher and similar drives requiring heavy starting torque, which have been heretofore driven by expensive prime movers in which low cost and efficiency have been necessarily sacrificed to secure large starting torque at very low starting speeds.

The present invention provides automatic power transmitting mechanisms having the highly desirable operating characteristics of those disclosed in my co-pending applications above referred to, and further highly desirable features and characteristics to be hereinafter pointed out, but are constructed in a somewhat different manner.

It is a primary object of the present invention to provide compact, flexible and light, but durable and highly efficient improved automatic power transmitting mechanisms.

Another major object of the present invention is to provide novel automatic power transmitting mechanisms, which will transmit power from the prime mover to the load through a torque multiplying mechanism when the load handled by the mechanism is being started or is operating at relatively low speeds; which will automatically and comparatively rapidly establish direct drive between the prime mover and the load when the speed of the prime mover is such that it can adequately handle the load without the aid of torque multiplication, whereby, excessive slippage, when the transition from torque multiplying to direct drive is taking place, is avoided.

It is a further important object of my invention to devise, for use in a transmission mechanism of the type wherein a friction disc type clutch is utilized to effect a transition from indirect to direct drive between a driving member and a driven member, a novel mechanism for automatically and comparatively rapidly bringing the driving and driven members into synchronism when certain of the parts attain a predetermined rotative speed.

Another object of my invention is to provide automatic power transmitting mechanism of the type wherein a speed responsive mechanism is utilized to bring frictional members into engagement; with mechanism for modifying the action of the speed responsive mechanism so as to produce a predetermined rate of pressure build-up between the frictional members when one of the latter is accelerated through a certain speed range.

Another object of my invention resides in the provision of automatic power transmitting mechanisms of the type wherein a speed responsive mechanism is adapted to bring frictional members into engagement; with means for retarding the action of the speed responsive mechanism so that the pressure builds up between the frictional members at a rate that is different from the rate of acceleration of the latter.

It is a further object of my invention to provide automatic power transmitting mechanisms of the type wherein frictional members are adapted to be brought into engagement under the influence of mechanism that is responsive to the speed of one of the members; with means for delaying the action of the speed responsive mechanism whereby engagement of the frictional members under the influence of the speed responsive mechanism is confined to the upper part of the operating speed range of the frictional members, and pressure is built up comparatively rapidly between them when the members are accelerated through their upper speed range.

It is another object of the present invention to equip automatic transmission mechanisms with an automatic clutch mechanism for bringing certain of the transmission parts into synchronism, which is so designed, that it is normally non-responsive to the speed of rotation of the transmission parts when the parts are rotating at comparatively low speeds, and which responds to the speed of rotation of certain of the parts to bring them into synchronism when one of the parts attains a predetermined speed.

Another object of the present invention is to provide power transmitting mechanisms which will automatically and smoothly transmit power from the prime mover to the load through a slipping, torque multiplying coupling when the load is being started or is operating at a relatively low speed; which will directly couple the prime mover with the load when the speed attained by the load is such that the prime mover does not need torque multiplication to adequately handle it; and which may be manually operated, with a minimum of effort, to prevent the transition from indirect torque multiplying drive to direct drive from being automatically effected.

It is another object of the present invention to devise automatic power transmitting mechanisms of the type wherein an automatic clutch mechanism having speed responsive mechanism, is utilized to automatically effect a transition, from indirect to direct drive, so that the transition from the indirect to direct drive may be prevented from taking place without restraining the action of the speed responsive mechanism.

Another important object of my invention is to provide novel automatic power transmitting mechanisms of the character mentioned with means for establishing a reverse drive between the prime mover and the load and to simultaneously render the mechanism inoperative to automatically directly couple the prime mover and load.

A further object of my invention is to so devise automatic power transmitting mechanisms of the type wherein a plurality of automatic clutches are employed to effect a predetermined mode of operation of the mechanisms; that the major corresponding parts of the clutches are structurally identical, thereby materially reducing the cost of production of the transmission mechanisms.

It is another object of the present invention to so design automatic power transmitting mechanism that substantially standard automatic clutches may be employed therein.

The present invention further aims to provide novel power transmitting mechanisms which will automatically establish a torque multiplying connection between the prime mover and the load when the load is being started or is operating at relatively low speeds; which will directly couple the prime mover and the load when the load has attained a speed sufficiently high that the prime mover can adequately handle it without torque multiplication; and which may be provisioned to permanently establish a torque multiplying connection between the prime mover and the load for preventing the prime mover and the load from being automatically directly coupled.

A further object of the present invention is to provide automatic power transmitting mechanisms which will automatically transmit power from the prime mover to the load through a torque multiplying mechanism when the load handled by the mechanism is being started or is operating at relatively low speeds; which will automatically directly couple the prime mover and the load when the prime mover can handle the load without torque multiplication; and which has mechanism associated with the torque multiplying mechanism for disconnecting the prime mover and load.

Another object of the present invention is to provide automatic power transmitting mechanisms of the character mentioned with a torque multiplying mechanism which is normally inoperative to transmit driving efforts to the prime mover when the load is tending to drive the prime mover but which may be controlled during any phase of operation of the mechanism to cause the torque multiplying mechanism to become operative to transmit power in this manner, whereby, in an automotive vehicle, the braking effort of the engine may be employed to control coasting tendencies of the vehicle.

My invention further aims to provide power transmitting mechanisms, of the type wherein the prime mover and load are normally automatically disconnected when the prime mover is operating substantially below the speed of efficient torque delivery, with means for transmitting torque from the load to the prime mover, or from the latter to the load, under such conditions.

It is a further object of the present invention to provide automatic power transmitting mechanisms which will automatically disconnect the prime mover from the load when the prime mover is operating substantially below the speed of efficient torque delivery; which will automatically transmit power from the prime mover to the load through a torque multiplying mechanism when the prime mover attains a predetermined speed; which will automatically directly couple the prime mover and the load when the respective speeds of the prime mover and the load are so correlated that the prime mover can adequately handle the load without torque multiplication; and which may be controlled to establish a coupling for transmitting driving efforts from the load to the prime mover or for establishing a torque multiplying connection between the prime mover and the load during any phase of transmission operation.

It is another object of the present invention to provide novel torque multplying mechanisms having torque multiplying elements that are normally inoperable to transmit rotative efforts from the load to the prime mover, and which may be operated to transmit retrograde rotative efforts from the load to the prime mover by shifting certain parts thereof so as to establish a different rotation between them.

A still further object of my invention is to provide automatic power transmitting mechanisms of the type wherein the transition from indirect to direct drive is automatically effected, with novel simplified automatic clutch mechanisms for effecting the transition from indirect to direct drive with the proper degree of rapidity to produce smoothly operating and thoroughly practical transmission units for automotive or similar drives.

My invention further provides power transmitting mechanisms of the character mentioned utilizing a plurality of automatic clutches, so designed that all of the clutch mechanisms incorporated therein may be of the automatic type and completely isolated from the torque multiplying mechanisms and bearings so that the clutch mechanisms utilized may be of the dry or self-lubricated type, thus avoiding uncontrollable modification of the operating characteristics thereof through exposure to gear and bearing lubricants.

A still further object of my invention is to provide novel automatic clutch mechanisms that are rugged, simple in design, and highly efficient and which are especially effective in automatic power transmitting mechanisms of the character mentioned, although they are not limited to such use.

It is another object of my invention to provide automatic power transmitting mechanisms of the type wherein a plurality of automatic clutch mechanisms operate in sequence under the influence of speed responsive mechanisms to establish a torque multiplying coupling and then a direct coupling between the prime mover and the load, with means for manually declutching any of the automatic clutch mechanisms during any phase of operation independently of the action of the speed responsive mechanisms.

Further objects of my invention will become apparent as the description thereof proceeds in connection with the annexed drawings and are pointed out in the annexed claims.

In the drawings:

Figure 2 is a fragmental sectional view of the primary clutch mechanism illustrated in Figure 1 and illustrates the manner in which the driving and hold-back springs are associated with the clutch parts.

Figure 3 is a fragmental sectional view of the secondary clutch illustrated in Figure 1, and illustrates further details of the structure involved.

Figure 4 is a view illustrating the lower part of the primary clutch shown in Figure 1 and shows the parts in the positions they assume when the clutch is automatically engaged.

Figure 5 is a sectional view taken substantially on the line V—V of Figure 1, looking in the direction of the arrows.

Figure 6 is a sectional view taken substantially on the line VI—VI of Figure 1, and illustrates the parts as they appear when viewed in the direction of the arrows.

Figure 7 is a detailed sectional view taken generally on the line VII—VII of Figure 6, looking in the direction of the arrows.

Figure 8 is a fragmental sectional view taken approximately on the line VIII—VIII of Figure 1.

Figure 9 is an elevational view of the mechanism shown in Figure 1 and illustrates the mechanism for controlling the operation thereof.

Figure 10 is a longitudinal sectional view of another form of automatic power transmitting mechanism embodying my invention.

Figure 11 is a fragmental sectional view taken substantially on line XI—XI of Figure 10, looking in the direction of the arrows.

Figure 12 is a fragmental sectional view of the primary clutch mechanism illustrated in Figure 10.

Figure 13 is a longitudinal sectional view of another form of automatic power transmitting mechanism embodying my invention.

Figure 1:
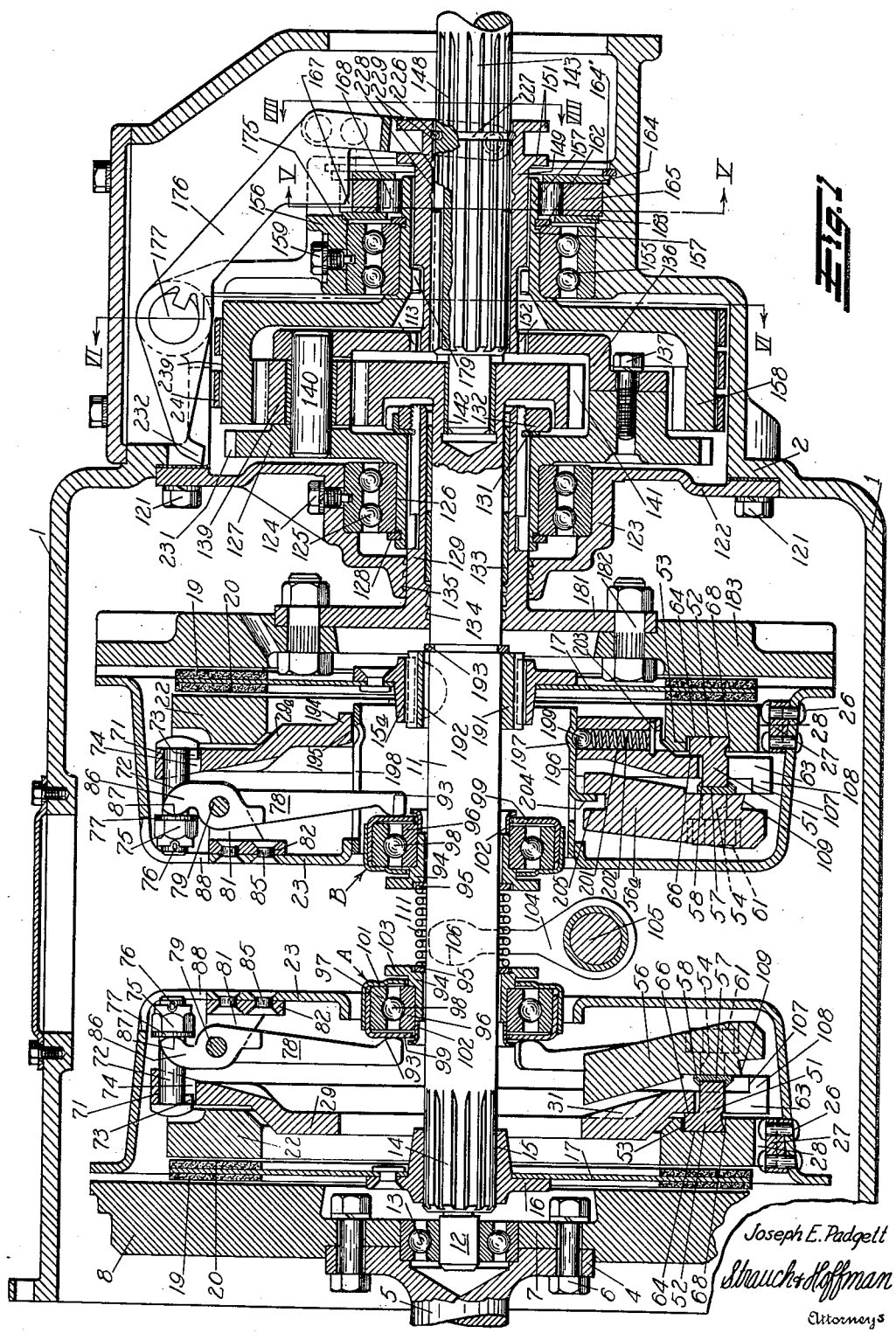
Figure 1 is a longitudinal sectional view of one form of automatic power transmitting mechanism embodying my invention, and illustrates the gear mechanism thereof, rotative through an angle of 90° for the purpose of more clearly showing the structure involved.

Referring to the drawings, wherein like reference characters designate like parts throughout the several views, in Figure 1 a housing I is shown, which may be connected to a prime mover and in which the mechanism is enclosed. Housing I is provided, intermediate of its length, with an inwardly extending annular portion 2, and co-operates with a member to be hereinafter described to divide the housing into a clutch chamber and a gear chamber.

Flange 4 of engine or driving shaft 5, extends into the clutch chamber and secured thereto by means of bolts 6 or the like, in well known manner, is web portion 7 of flywheel 8. Disposed in axial alignment with driving shaft 5, and mounted for rotation, is a driven shaft 11, which will be hereinafter termed the intermediate shaft, and which is reduced at 12 and journaled in a suitable anti-friction pilot bearing assembly 13, mounted in web 7 of flywheel 8 and in a bore in the end of shaft 5 in well known manner.

*Primary clutch mechanism*

The primary clutch may be of any desired type whose operating characteristics adapt it for the purpose here involved, but I preferably utilize the type of mechanisms illustrated in my co-pending application Serial Number 669,766, filed May 6, 1933, which may be referred to to be a full disclosure thereof. Briefly it is constructed and associated with the mechanism as follows.

Intermediate shaft 11 has the other end thereof operably connected to a novel automatic transmission for amplifying the torque applied to the final driven member in a manner to be presently described. Shaft 11 has a splined portion 14 upon which a correspondingly-splined hub 15 is slidably mounted. Hub 15 is provided with a flange 16 to which is secured, by means of rivets or the like, a driven disc 17. While I have disclosed disc 17 as being rigidly secured to flange 16 of hub 15, it is to be understood that if it is desired a suitable resilient coupling, of any well known construction, may be interposed between these two members for the purpose of dampening out torsional vibrations set up in the crank shaft of the engine.

Disc 17, near its periphery is provided with a facing 19 and 20 respectively, which may consist of any material that has the required characteristics to give the correct frictional gripping force, and at the same time has wearing qualities adapting it for this purpose. I prefer, however, to use the types of material which in practice have given very satisfactory results in an automatic slipping drive and clutch mechanism of the "Powerflo" type. Frictional facings 19 and 20 may be secured to disc 17 in any suitable manner as for instance by rivets or the like.

Facing 19, secured to disc 17, cooperates with the flat face of flywheel 8 and is adapted to be engaged and frictionally driven thereby. Facing 20, provided on disc 17, cooperates with a plate 22 which will be hereinafter termed the automatic plate for the reason that it is automatically actuated and is adapted to engage and clamp driven member 17 between it and the flat face of the flywheel. Disc 17, along with hub 15 and facings 19 and 20, constitutes the driven member, and this entire driven assembly will be hereinafter termed driven member 17 for sake of brevity. Plate 22 is of substantial thickness so that it may possess a sufficient degree of rigidity to prevent undesirable distortion and warpage thereof during operating conditions.

A cover member 23 is secured to the flywheel by means of cap screws 24. Before cover 23 is secured to the flywheel, however, spacer members 25 are preferably inserted between their cooperating surfaces to space the cover from the flywheel for the purpose that will presently appear. Secured to the inner walls of cover 23, by means of rivets 26 or the like, are preferably three symmetrically arranged driving lug or key members 27. Key members 27 are received in, and cooperate with the walls of recesses 28 formed in automatic plate 22 to establish a driving connection between flywheel 8 and the automatic plate.

Disposed parallel to plate 22 is a plate 29, and it will be hereinafter referred to as a reaction plate because it takes the reaction of the speed-responsive mechanism in a manner to be presently described. Reaction plate 29 is provided with stiffening webs 31, and is driven by automatic plate 22 through the medium of a plurality of cap screws 32. Referring particularly to Figure 2, each cap screw 32 is provided with a reduced end 33 which is threaded into automatic plate 22, and the thread employed is preferably of the Dardelet or other self locking type so as to prevent the cap screws from working loose in operation. Cap screws 32 extend through, and lie in slidable driving engagement with the walls of recesses 34 formed in reaction plate 29, and are encircled by washers 35 and compression springs 36. Springs 36 act against the heads of screws 32 and react against plate 29, to thereby urge the automatic and reaction plates toward each other at all times, and they will be hereinafter referred to as hold-back springs. The hold-back spring assemblies are preferably symmetrically disposed in pairs about the periphery of the plates and in the present instance six are employed, but it is to be understood that more or less than six properly designed hold-back spring assemblies may be used if desired without in any way departing from the spirit of my invention. The hold-back assemblies accordingly establish a driving connection between the automatic and reaction plates, and at the same time resiliently urge them toward each other.

Reaction plate 29 is normally urged toward the flywheel by a plurality of compression springs 37, that are retained in position against plate 29 by means of bosses 38 formed on the latter. Springs 37 react against the surface of cover 23, and are centered thereon by means of pressed out portions 39 formed in cover 23. Springs 37 are preferably six in number and are disposed on substantially common radii with the hold-back assemblies as shown in Figure 2. Reaction plate 29 however, is normally held in the position shown in Figure 1, when driving shaft 5 is rotating at or below the idling speed of the engine or other prime mover, by means of a throwout mechanism that will presently be described.

The automatic drive reaction plates may be actuated away from each other by any suitable speed-responsive mechanism, to produce clutch engagement, but in the present embodiment of my invention it preferably takes the form of centrifugally operable mechanism. Preferably three weight levers 51 having integrally formed heads 52, are symmetrically arranged between the pairs of pressure springs 37, and have their heads 52 received in rectangular recesses 53 formed in automatic plate 22.

Each lever 51 is provided with a pair of threaded portions 54, which are received in a pair of apertures in a weight element 56. A reenforcing element 57 is disposed between weight 56 and lever 51, and is provided with portions 58 that embrace the sides of lever 51, and a flat surface that is adapted to abut the surface of weight 56. Weight 56 and member 57 are held in place on lever 51 by means of nuts 61, turned on portions 54, and seating in countersinks formed in weight 56. When nuts 61 are turned home, the parts are rigidly clamped in assembled condition and portions 58 of member 57 cooperate with lever 51 to prevent angular movement of the latter with respect to weight 56. Although I prefer to secure levers 51 to weights 56 in the manner just described, it is to be understood that the weights may be integrally formed with the levers if desired, without departing from the spirit of my invention.

Levers 51 are of substantial width and extend through recesses 63 formed in reaction plate 29. Heads 52 are provided with flat faces 64 that normally abut the bottoms of recesses 53 when the driving shaft is operating at or below idling speed, and by the term "idling speed", I mean the particular desired automatic uncoupling or disengaging speed of the driving shaft, and if an internal combustion engine is employed as the prime mover, the idling speed will be in the neighborhood of four hundred to five hundred revolutions per minute.

Heads 52 are also provided with reaction faces 66 which abut the face of reaction plate 29 at all times, and are designed for fulcruming engagement therewith during operation of the weights. The surface of plate 29 that cooperates with faces 66 of weight-heads 52 may be ground and polished so that relative sliding movement thereof may occur with a minimum of friction, if desired.

Heads 52 have their outer sides relieved to provide knife-like edges 68 which are adapted to rock or pivot in the dihedral angles defined by the bottom and outer faces of recesses 53 formed in automatic plate 22. The relieving operation enables a good knife edge 68 to be formed on each weight head, and allows pivotal movement thereof without interference from the outer side walls of recesses 53. However, it is to be understood that unrelieved weights may be employed in recesses that are suitably designed so as to have relieved outer side walls if desired. It is also to be understood, that instead of providing individual recesses 53 for cooperation with the weight heads, a single annular groove, as shown in my co-pending application, Serial Number 660,179, filed March 9, 1933, may be formed in automatic plate 22 if desired, without departing from the spirit of the present invention.

Recesses 53 are formed in automatic plate 22 in any desired manner, as for instance by a milling cutter or the like, and weight heads 52 are prevented from moving longitudinally within the recesses so formed, by the engagement of the walls of recesses 63 formed in plate 29 with the sides of levers 51. Heads 52 fit rather snugly between the inner and outer side walls of recesses 53 so that they are restrained from shifting bodily inwardly or outwardly, thereby insuring dynamic balance of the mechanism at all times. Knife edges 68 are adapted to cooperate with the flat bottom faces of recesses 53 and thereby act in line contact upon plate 22 for a substantial distance across the face thereof, whereby uniform distribution of pressure is effected. Each weight 56 is further provided with recesses (not shown) which allow free operation thereof without interference from bolts 32 and spring 36.

The mass of weights 56, and the number of weight and lever assemblies employed in a particular installation, is determined by a consideration of the required pressure that they must transmit under the desired speed conditions to urge the clutch plates into final non-slipping engagement. In the automatic drive clutch mechanism shown, three equally spaced weight assemblies are preferably employed.

When shaft 5 is stationary, or is operating at or below a speed corresponding substantially to the idling speed of the prime mover employed to drive it, the parts assume the positions in which they are shown in Figure 1. Heads 52 of levers 51 are clamped between plates 22 and 29, under the influence of springs 36 acting against plate 29 and cap screws 32, and plate 29 is held in the position shown, against the action of springs 37, by means of a throwout mechanism that will now be described.

Extending through apertures 71 formed in plate 29, and preferably symmetrically disposed between the weight assemblies are a plurality of bolts 72. The heads of bolts 72 are provided with blade like portions 73 which seat in recesses 74 located in plate 29 and serve to hold bolts 72 against rotation. Castle nuts 75 are threaded on bolts 72 and are adapted to be held in adjusted positions thereon by means of cotter pins 76. Hardened washers 77 are disposed on bolts 72 and cooperate with three clutch fingers 78 to produce movement of plate 29 away from the flywheel. Fingers 78 are pivoted on pins 79 secured in spaced bars 81 formed on bracket members 82. Pins 79 are preferably held in position in bars 81 by means of cotter pins or the like, and brackets 82 are secured against parallel portions of cover 23 by means of rivets 85 or the like. Fingers 78 are provided with bifurcated portions 86, and the latter have curved faces 87, that cooperate with washers 77 in a manner to be presently described.

Bolts 72 and nuts 75 are adapted to partially extend through apertures 88 formed in cover 23, and the apertures are preferably of a size sufficient to allow a wrench or the like to be applied to nuts 75 for clutch adjustment purposes.

Movement of the inner ends of fingers 78 to the left, in Figure 1, through the intermediary of bolts 72, causes movement of plate 29 away from the flywheel against the action springs 37. Movement of the reaction plate produces similar movement of plate 22 because the hold-back assemblies hold the two plates in unitary relationship at all times. Fingers 78 are adapted to be actuated in this manner by means of a throwout assembly that will now be described.

Cooperating with curved faces 93 formed on levers 78 is a throwout assembly designated generally at A. The throwout assembly consists of a sleeve member 94 which is mounted for axial movement by means of a washer 95. Washer 95 is preferably constructed of an oil impregnated material such as "oilite", or the like, so as to be self-lubricating, and is received in a countersink in sleeve 94 and is slidably mounted on shaft 11. Secured to sleeve 94 in any desired manner is a ball race 96. Disposed between ball race 96 and an outer ball race 97 are a plurality of anti-friction balls 98 and the bearing is designed to take a thrust load that is one hundred percent of the radial load. Secured to the outside of race 97 is a hardened stamping 99 which cooperates with fingers or levers 78 and also cooperates with a stamping 101 to define a grease chamber.

Grease or other lubricant may be introduced into the grease chamber in any desired manner, but the bearing is usually packed with grease upon assembling it. With the grease reservoir formed in this manner, leakage of grease therefrom during operation is prevented because centrifugal force tends to throw the grease outwardly and maintain it in the fluid-tight annular portion of the grease reservoir. In order to prevent dirt and other extraneous matter from working into the grease reservoir, a stamping 102 is preferably secured to the inner wall of race 96 in abutting relation to sleeve 94. Stamping 102 operates as a dirt "slinger" to keep the dirt from working into the grease reservoir between stamping 99 and race 96.

Although I prefer to use a bearing assembly of the character just described, it is to be understood that any other suitable construction may be used without departing from the spirit of the present invention.

Adapted to cooperate with a flange 103 formed on sleeve 94 is a throwout fork 104, which is secured to a shaft 105 journalled in housing 1. Fork 104 is provided with curved faces 106 which are adapted to contact flange 103. Shaft 105 extends outwardly of housing 1 and is provided with mechanism to be described hereinafter, for selectively holding it in four different positions. The parts are shown in Figure 1 in what is termed the automatic position, with the throwout assembly holding reaction plate in the position shown, against the action of spring 37.

When the parts are held in automatic position, and the engine or other prime mover is operating at idling speed, the primary clutch is disengaged and shafts 5 and 11 are uncoupled.

*Automatic operation of the primary clutch*

As driving shaft 5, and flywheel 8 are accelerated, weights 56 tend to swing or rock outwardly about their knife-edges 68 as axes in response to centrifugal force. The weights are yieldingly restrained against this tendency by the hold-back assemblies, which are preferably of sufficient strength to restrain action of the weights until a speed substantially in excess of idling speed is attained. As this speed is attained, the weights rock comparatively rapidly outwardly against the action of the hold-back springs. As this occurs, reaction faces 66 of heads 52 fulcrum and slide on the face of plate 29, and knife edges 68, by virtue of their engagement and fulcruming action upon the flat bottom surfaces of recesses 53 in automatic plate 22, force automatic plate 22 away from reaction plate 29 against the action of hold-back springs 36, and into engagement with facing 20 of disk 17, on a three-point support, thus causing disk 17 to move axially and bring the facing 19 thereof into contact with the flywheel face.

Movement of automatic plate 22 away from reaction plate 29 is opposed by hold-back springs 36 and therefore weights 56 are held under control. Hold-back springs 36, therefore, in addition to predetermining the speed of the mechanism at which automatic engaging operation is initiated, exert a steadying influence upon the clutch parts.

After the driven member is thus frictionally clamped or gripped between automatic plate 22 and flywheel 8, movement of plate 22 is substantially arrested, and further rocking movement of weights 56, in response to a further increase in centrifugal force, causes faces 66 of heads 52 to force reaction plate 29 away from the flywheel against the action of springs 37, and hold-back springs 36. Movement of plate 29 in this manner causes pressure to slowly build up in springs 37 and a corresponding pressure is built up between the edges 68 of heads 52, and the bottoms of the recesses in automatic plate 22 with the result that pressure is slowly built up between the frictional faces of the driving and driven members and shaft 11 is picked up smoothly and without shock. When the pressure builds up to a predetermined value, the plates are brought into non-slipping engagement. As the speed further increases, the pressure builds up further, and when shaft 5 and flywheel 8 attain a predetermined speed, weights 56 rock into contact with arcuate faces 107 provided on rim portions 108 which are formed on reaction plate 29. In order to stop weights 56 in a definite plane that is normal to the mechanism, and thus insure dynamic balance of the mechanism, stop-edges on faces 109 are accurately formed on weights 56 for cooperation with faces 107. When the weights have moved into their outermost positions with their faces 109 in contact with faces 107, further acceleration of shaft 5 is ineffective to cause a further pressure to be built up between the plates. The plates are thereby held in non-slipping engagement under a predetermined pressure, and a positive friction coupling exists between shafts 5 and 11, and the parts assume the position shown in Figure 4.

In view of the resilient nature of the backing means for the reaction member, should certain weights 56 swing further outwardly than the remaining weights during the engaging operation, the pressure exerted by them is nevertheless uniformly distributed about the area of plate 22 for the reason that reaction plate 29 can tilt or float, and take a slight angular position with respect to automatic plate 22, due to the fact that the sole movement limiting means of the reaction member is constituted by bolts 32, and the latter are designed to provide sufficient play or clearance to permit this tilting action.

When the automatic engaging operation just described is taking place, reaction plate 29, and its associated parts, are moved to the right of the positions in which they are shown in Figure 1. Movement of the reaction plate 29 to the right causes the inner ends of fingers 78 to tend to move from their cooperating engagement with the face of the bearing assembly, thereby relieving the throwout bearing assembly of substantially all pressure. In order to maintain the throwout assembly in contact with fingers 78 at all times, so as to keep the latter from rattling when they are relieved of the pressure of springs 37, I preferably mount a compression spring 111 on shaft 11. Spring 111 acts against washer 95 of throwout assembly A and reacts against washer 95 of an exactly similar throwout assembly B, whose functions will be pointed out hereinafter. The throwout bearing assembly therefore only operates under the pressure of springs 37 when the clutch is operating at idling speeds or is manually declutched, and it therefore receives only a minimum amount of wear and its life is therefore greatly increased.

Due to its slipping drive characteristics, the present mechanism constitutes a drive mechanism as well as a clutch, and while it does not multiply the torque delivered from shaft 5 to shaft 11, it permits the engine to operate at a higher speed, and, consequently, at a higher point on its speed-torque curve, and deliver more power, than if substantially non-slipping conditions existed between shafts 5 and 11, and this feature of the present mechanism renders it entirely feasible to utilize a low value of torque multiplication in the torque multiplying mechanism employed in my mechanisms.

*Manual disengaging operation of the primary clutch*

When the plates have been automatically brought into full driving engagement in the manner previously described, shaft 105 may be operated to displace throwout bearing assembly A and the inner ends of levers 78 to the left of the positions in which they are shown in Figure 1. Movement of levers 78 in this manner causes them to fulcrum about and react against bolts 72 and withdraw the reaction plate from the flywheel. Withdrawal of the reaction plate produces withdrawal or disengagement of automatic plate 22 from the driven member because plates 22 and 29 are held in unitary relation by the holdback assemblies. If the engine speed is maintained above the predetermined engaging speed during the manual declutching operation, weights 56 remain in their outermost positions as seen in Figure 4; therefore, the declutching operation does not involve retracting the weights against the action of centrifugal force, which, at high speeds might be sufficiently high to preclude affecting the manual declutching operation, if the latter involved retracting the weights. Shaft 105, through the medium of the central mechanism to be presently described, may be operated to produce manual engagement of the plates, (if the engine is operated above the engaging speed of the mechanism) in a manner similar to a manual clutch for maneuvering the vehicle into and out of parking position or for navigating in heavy traffic in a manner that will be hereinafter described.

*Manual engaging operation of the primary clutch*

As has been previously pointed out, when shaft 5 is operating substantially at the idling speed of the prime mover, or is stationary, and shaft 105 is positioned so as to dispose the throwout bearing in the automatic position shown in Figure 1, a clearance exists between the clutch plates, and shafts 5 and 11 are accordingly disconnected. When it is desired to establish a driving connection between shafts 5 and 11 under these conditions, shaft 105 is actuated to allow throwout assembly A to move to the right under the influence of springs 37 acting through levers 78, and the springs are accordingly allowed to bring the plates into driving engagement.

Holdback springs 36 and pressure springs 37 are preferably so designed, that when they are compressed by the action of weights 56, a slipping torque transmitting connection will be established between the driving and driven members, for a speed range as great as or greater than approximately 100% to 125% of the initial engaging speed of the driving member. For instance, if in the particular automatic clutch illustrated, the primary clutch commences to engage and transmit torque when the speed of the driving member is, for example 500 revolutions per minute, the engagement may be completed with sufficient pressure so that no slippage will exist between the driving and driven members when the driving member attains a speed of approximately 1000 or more revolutions per minute. The automatic clutch, in establishing a slipping drive between the prime mover and load, over a substantial speed range, permits the prime mover to operate at a higher point on its speed-torque curve and therefore to develop more torque than if the conditions of substantially no slippage between the prime mover and load existed.

In the particular clutch illustrated, hold-back springs 36 may be so designed that they urge automatic plate 22 and reaction plate 29 together, with a total force of approximately 400 pounds, and pressure springs 37 are designed that they oppose the reaction of reaction plate 29 with a total force of approximately 1,200 pounds when the plates are fully engaged. When weights 56 are in their outermost positions against flange 109, the pressure is of course in excess of 1,200 pounds. Therefore, weights 56 must exert a certain force to initiate clutch engagement, and approximately four times this force to complete the engagement, when they are exerting sufficient pressure to establish a non-slipping drive. Accordingly, in view of the fact that in centrifugal mechanisms of this character, the available forces vary as the square of the speed, the speed of the driving member at the completion of clutch engagement, will be double the speed at which clutch engagement is initiated, and a wide range of slipping drive is provided, permitting the prime mover to operate at sufficient speed to develop and apply substantial torque to the drive line at the initiation of, and throughout the slipping drive operation.

*Torque multiplying and related mechanisms*

Secured to boss portion 2, formed on housing 1, in any suitable known manner, as by means of cap screws 121 or the like, is a bearing support 122, having a cylindrical partition member 123 formed thereon. Secured within partition member 123 against axial displacement by means of a set screw 124, is the outer race of a bearing assembly 125. The inner race of bearing assembly 125 supports the sleeve-like extension 126 of a planet gear carrier or cage member 127. Sleeve 126 is secured against axial displacement in bearing 125 by a split ring 128 that abuts the inner race thereof, and is sprung into a groove located in sleeve 126. The inner wall of sleeve 126 is splined and cooperates with similar splines located on the outer wall of a secondary clutch sleeve 129. A lock washer 131, having internal teeth formed thereon to cooperate with the splines of sleeve 129, is disposed on sleeve 129 and is clamped between cage member 127 and a nut 132 threaded on the splines of sleeve 129. Nut 132 secures sleeve 129 against axial movement within sleeve 126, and lock washer 131 is provided with external teeth that are adapted to be bent to embrace the sides of nut 132 when nut 132 has been turned home against the lock washer and cage member 127 to hold it in adjusted position.

The rear end of shaft 11 is journaled in bushings 133 or the like located within sleeve 129. Shaft 11 and sleeve 129 are therefore rotatably mounted with respect to each other, and sleeve 129, and sleeve 126 carried thereby, are rotatably mounted in bearing assembly 125.

Bearing support 122 constitutes a partition dividing housing 1 into a clutch chamber and a gear or torque multiplying mechanism chamber, and in order to prevent lubricant contained in the gear chamber from leaking into the clutch chamber between shaft 11, sleeve 129 and the bearing support, I have provided oil returning grooves 134 and 135 in sleeve 129 and bearing support 122 that cooperate with shaft 11 and the outer face of sleeve 129 respectively to return any lubricant that may be disposed between these members to the gear chamber.

Cage member 127 is secured to a mating cage member 136 preferably by means of cap screws 137. The cap screw assemblies are preferably three in number and are disposed at 120° intervals about members 127 and 136, and the cage members are also provided with recesses located between the bolt assemblies which receive planet gears or pinions 139. Planet gears 139 are bushed and are journalled upon shafts 140 supported in apertures in cage members 127 and 136 and mesh with a pinion 141, preferably integrally formed on the rear end of shaft 11.

Disposed in axial alignment with shaft 11, and mounted for rotation at its front end in a bushing 142 located in a recess in the rear end of shaft 11 is a driven shaft 143. Shaft 143 may be directly connected to the load handled by the transmission, or may be connected to a gear reduction or the like, and is journalled at its rear end in a bearing assembly secured in an aperture in housing 1 (not shown).

The intermediate portion of shaft 143 is provided with splines 148, with which a correspondingly splined sleeve 149 is slidably associated. A pair of spaced flanges 151 are formed on the rear portion of sleeve 149, and are adapted to cooperate with a shifting device hereinafter described. Formed on the front portion of sleeve 149 are a plurality of teeth 152, which are shown in Figure 1 as meshing or engaging with a plurality of internal teeth 113 formed on a cage member 136.

Mounted for rotation in a bearing assembly 155, secured in a cylindrical bearing support 156 carried by housing 1 is the sleeve portion 157 of an internal gear 158, that meshes with planetary gears 139. The outer race of bearing assembly 155 is positioned in member 156 by a set screw 159, and sleeve 157 is held against axial displacement within the inner race by a split ring 162 that is sprung into a groove in sleeve 157. A pair of rings 163 and 164 are held in place in member 156 by means of a split ring 164', which is sprung into a groove in member 156. Rotatably mounted in member 156, between rings 163 and 164, is a clutch member 165, having recesses or cam pockets 166 formed in its interior. Overrunning clutch rollers 168 are disposed in recesses 166 and are adapted to cooperate with the outer face of sleeve 157.

Referring to Figure 5, the outer faces 171 of recesses 166 are so inclined that counter-clockwise rotation of sleeve 157 with respect to member 165 tends to wedge rollers 168 between it and faces 171, and thereby lock sleeve 157 against rotation. Plungers 172, slidably mounted in recesses in member 165, are actuated by springs 173 to urge rollers 168 into wedging or locking relationship with sleeve 157 and faces 171.

The ends of split ring 164' are spaced apart and align with a notch 175 formed in member 156 and with a similar notch formed in ring 164. A latch member 176, rigidly mounted on a crossshaft 177 journalled in the side walls of housing 1, is adapted to have a portion thereof freely enter the space between the ends of split ring 164' and enter one of the notches 167 located in member 165 to lock the latter against rotation, as shown in Figure 1. With latch member 176 disposed in one of the notches 167 of member 165, sleeve 157 and internal gear 158 may rotate freely in a clockwise direction, (viewed from the left hand side of Figure 1) but are restrained against counter-clockwise rotation. When latch member 176 is withdrawn from notch 167, sleeve 157 is free to rotate in either direction. Although counter-clockwise rotative tendencies of sleeve 157 under the latter condition causes rollers 168 to be wedged between faces 171 and sleeve 157 to thereby lock members 158 and 165 together, member 165 may rotate in a counter-clockwise direction in member 156 as a journal, due to the fact that latch member 176 is withdrawn from notches 167 in member 165.

Internal teeth 179 are formed on the inner wall of sleeve 157 and are adapted to be selectively engaged with teeth 152 formed on sliding clutch member 149 for a purpose that will be pointed out hereinafter.

Secondary clutch mechanism

Secured to a flange 181, provided on sleeve 129, by means of bolt assemblies 182 or the like is a member 183, that supports the secondary clutch mechanism, and as the latter is similar in general to the primary clutch mechanism, like parts will not again be described.

In the secondary clutch, cover 23 is secured to member 183, and fingers or levers 78 cooperate with throwout assembly B in a manner that will presently be set forth. Movement of reaction plate 29a toward member 183 is limited by means of cap screws 184 which are preferably three in number and are symmetrically located between the lever assemblies. Cap screws 184 extend through apertures 185 in cover 23 and are provided with a shoulder 186 and are threaded into reaction plate 29a. Screws 184 normally hold reaction plate 29a in the position shown in Figure 1 while sleeve 129 is rotating below a predetermined speed or is stationary, and throwout assembly B is therefore not utilized to hold the secondary clutch parts in automatic position and when the engine is operating at idling speed or is stopped the parts assume the position shown in Figure 1, with the primary and secondary clutches disengaged.

Hub 15a, carrying disc 17, is preferably splined to a sleeve 191, and the latter is rigidly secured against rotation on shaft 11 by means of a key 192, and against axial displacement by means of a split ring 193, sprung into a groove in shaft 11.

Reaction plate 29a is provided with a flanged inner periphery 194 which defines a bearing 195. Slidably mounted for axial movement in bearing 195 and the flange in cover 23, is a preferably cylindrical sheet metal sleeve member 196 which is provided with a preferably annular corrugation 197. Levers 78 extend through slots 198 formed in sleeve 196 and serve to prevent the latter from being angularly displaced with respect to cover 23 and reaction plate 29a during operation of the mechanism. Cooperating with corrugation 197 are balls 199 which are preferably three in number and are slidably mounted in recesses 201 located in plate 29a. Balls 199 are urged toward sleeve 196 by compression springs 202, which react against pins 203 secured in plate 29a.

Sleeve 196 is further provided with tongues 204 which seat in recesses 205 formed in weights 56a and which serve to yieldingly resist operation of the latter in a manner that will hereinafter be described.

The secondary clutch functions in substantially the same manner as the primary clutch, but the action thereof is delayed through the influence of the retarding or delaying mechanism associated with the weights thereof. As member 183 is accelerated, centrifugal forces of increasing magnitude are developed in weights 56a, but as they are yieldingly restrained against outward rocking movement, through springs 36 and the influence of balls 199 acting upon sleeve 196, they do not immediately respond to acceleration of member 183. When member 183 has been accelerated to a speed predetermined by the mass of weights 56a, the strength of springs 36 and 202, which are dictated by the operating characteristics desired in the particular installation involved, weights 56a overcome the restraining action of balls 199 and springs 202 and rock outwardly comparatively rapidly, bringing the plates into engagement and causing pressure to build up therebetween comparatively rapidly. Movement of weights 56a outwardly in this manner causes sleeve 196 to move to the left. When member 183 is decelerated to a predetermined speed, springs 36 force the reaction and automatic plates towards each other which results in weights 56a rocking inwardly and causing sleeve 196 to move to the right to a position where balls 199 snap into groove 197 formed in sleeve 196.

Although I have illustrated spring pressed balls as cooperating with sleeve 196 to restrain movement of the latter under the influence of weights 56a, it is to be understood that any other suitable type of means may be employed for this purpose without departing from the spirit of the present invention. It is also to be understood, that although I have shown a single mechanism for yieldingly restraining the action of the speed responsive mechanism, and prefer to employ this organization for the reason that it results in releasing all of the weights simultaneously, individual restraining devices may be associated with the speed responsive mechanism if desired, and the appended claims are intended to embrace organizations of this character.

By providing the secondary clutch with an action delaying mechanism, I am able to obtain a mechanism which not only has superior operating characteristics, but is also cheap to manufacture as the basic structure of the primary and secondary clutches is identical, and the clutch facings employed may also be identical in character.

In the present mechanism, which is designed for use in a vehicle of moderate size, the secondary clutch is designed so that the detents or other retarding mechanism releases the weights at a propeller or driven shaft speed of approximately 900 revolutions per minute, and full non-slipping drive is secured at approximately 1000 revolutions per minute. It is to be understood, however, that these figures are merely illustrative and will undoubtedly vary depending upon the type of vehicle or the requirements of the particular installation involved.

It is also to be understood that the engagement of retarding mechanism for the secondary clutch and also cap screws 184 may be dispensed with and fluid pressure actuated mechanism, or the like, controlled by the deviations in the magnitude of the reaction applied to gear 158, employed to allow the parts to move from automatic position to fully or manually engaged position when the load has been accelerated to a speed where the prime mover can handle it without the aid of torque multiplication.

General operation

The operation of the mechanism so far developed will now be described. When driving shaft 5 is operating at a predetermined speed, for example, at a speed corresponding substantially to the idling speed of the prime mover utilized therewith, there is no driving connection between shafts 5 and 11, as the primary and secondary clutches are disengaged as illustrated in Figure 1. With throwout fork 104, and latch 176 disposed in the positions shown in this figure, the mechanism is provisioned for forward drive, and acceleration of the driving shaft causes the automatic power transmitting operation to take place.

Low speed or torque multiplying drive

As the driving shaft is accelerated, centrifugal weights 56 fulcrum outwardly in response to centrifugal force and cause the primary clutch mechanism to be engaged in the manner previously described, thereby coupling shafts 5 and 11. Clockwise rotation of shaft 11, viewed from the left-hand end of Figure 1, through the medium of pinion 141 formed thereon, tends to produce counter-clockwise rotation of planet gears 139 about their axes, assuming that rotation of shaft 143, to which they are connected, is resisted by a load, or the like. Counter-clockwise rotative tendencies of planet gears 139, imposes a reaction upon internal gear 158, tending to produce counter-clockwise rotation of the latter. Counter-clockwise rotation of internal gear 158 however is prevented by the action of clutch rollers 168, which cooperate with sleeve 157 and member 165 under these conditions to lock sleeve 157 against rotation. Planet gears 139 are therefore caused to planetate clockwise within stationary internal gear 158, which produces similar rotation of cage members 127 and 136, sleeve 129, sliding clutch member 149, and shaft 143, upon which the latter is splined. A torque multiplying coupling is therefore automatically established between driving shaft 5 and driven shaft 143, the torque amplification depending upon the gear ratios utilized.

When navigating in heavy traffic, or parking positions, shaft 105 may be operated by the control lever that will be hereinafter described, for controlling the engaging action of the primary clutch.

Automatic transition from torque multiplying drive to direct drive

With shafts 11 and 143 coupled through the medium of pinion 141 and planet gears 139, as previously explained, when shaft 143 attains a speed corresponding to a speed of the prime mover sufficiently high to enable the latter to deliver adequate torque to handle the load without torque multiplication, centrifugal weights 56a pivot outwardly and cause engagement of the secondary clutch mechanism to be effected in the manner previously described. Engagement of the secondary clutch mechanism causes torque to be transmitted from shaft 11 through disc 17, member 183, and sleeve 129 to the driven shaft, and the latter is accordingly gradually accelerated under the combined influence of the torque multiplying drive and the direct torque transmitted through the secondary clutch mechanism. Acceleration of shaft 143 in this manner causes internal gear 158 to rotate in a clockwise direction, which in turn causes disengagement of rollers 168 from their wedging disposition between sleeve 157 and member 165. When engagement of the secondary clutch mechanism is complete, shafts 11 and 143 rotate in unison, and internal gear 158 is also given a like rotation because planet gears 139 do not rotate about their axes at this time in view of the fact that they are journalled in cages 127 and 136 and mesh with pinion 141, which are stationary with respect to each other.

When operating a vehicle provided with an automatic transmission mechanism of the character described in direct drive, all that is necessary to bring it to a stop, is to release the accelerator and to apply the brakes. When the vehicle has decelerated to a predetermined speed, through the combined braking action of the engine and the brake mechanism, centrifugal weights 56a are restored to their neutral positions under the influence of holdback springs 36, releasing the secondary clutch. Shaft 143, under the influence of the momentum of the vehicle, then causes gears 139 to planetate around pinion 141. The engine tends to drop to idling speed because the throttle is usually closed under these conditions. This tendency of the engine causes pinion 141 to resist rotation of planet gears 139 and the latter are accordingly restrained from planetating, and they rotate in a clockwise direction as viewed from the left end of Figure 1, about their respective axes, and cause internal gear 158 to rotate in a similar direction. As the overrunning clutch will lock gear 158 only against counter-clockwise rotation, clutch rollers 168 will be shifted into their disengaged positions, and gear 158 will rotate clockwise in its bearings 155, thus relieving the gears of all tooth pressure, the driving connection will be broken and the engine will accordingly drop to idling speed, releasing the primary clutch connection between shafts 5 and 11. This condition is maintained until the engine is again accelerated to a speed corresponding to the engaging speed of the primary clutch. Although the braking effect of the engine is not utilized after disengagement of the secondary clutch, the vehicle speed at which centrifugal weights 56a retract is so low that the greater part of the braking effect of the engine has already been utilized in decelerating the vehicle, and is entirely adequate under normal operating conditions. As soon as disengagement of the clutch interconnecting shafts 5 and 11 occurs, shaft 11 and driven member 17 are free to idly rotate and may do so under the influence of shaft 143 acting through the gears. Gear 158 may likewise rotate since it is urged in a clockwise direction by planets 139, so long as shaft 143 rotates. However, under these conditions little or no rotation of planets 139 about their axes occurs, depending upon the friction present in the bearings for shaft 11 and gear 158 respectively.

After both clutch mechanisms are released, the vehicle may be brought to a complete stop by continued application of the brake mechanism, or if desired, the engine may be accelerated, causing weights 56 to swing outwardly about their pivots thereby coupling shafts 5 and 11. Pinion 141 will then drive planet gears 139 and the reaction of gears 139 against internal gear 158 tends to produce counter-clockwise rotation of gear 158, thus causing clutch rollers 168 to lock gear 158 in a stationary condition, thereby causing planet gears 139 to planetate, again transmitting amplified torque to shaft 143. When shaft 143, and consequently the vehicle, attains sufficient speed, centrifugal weights 56a again swing outwardly about their pivots and actuate the secondary clutch to again establish a direct drive between shafts 11 and 143 in the manner previously described.

*Manual disconnection of the driving and driven shafts*

It is sometimes desirable to disconnect the prime mover from the load for the purpose of allowing the prime mover to operate substantially above idling speed to "warm up," or for effecting adjustments of the carburetor thereof, if it is an engine of the internal combustion type. To this end, sliding clutch member 149 is adapted to be moved axially to bring its teeth 152 out of engagement with teeth 113 formed on cage member 136. Clutch member 149 may be operated in any suitable manner, but I prefer to actuate it by means of lever 176, previously described. Lever 176 is offset at its lower end to clear flange 151, and is provided with a shouldered pin 212. The reduced portion of pin 212 extends through an aperture in lever 176 and has the end thereof swaged over to hold it securely in place. Secured to lever 176, intermediate its length, by rivets 213 or the like, is a curved finger 214 provided with a similar pin 215. Pins 212 and 215 are disposed between flanges 151, and upon oscillation of shaft 177 produce axial movement of clutch member 149 upon shaft 143.

As previously explained, shaft 177 is journalled in suitable bearings provided in housing 1, and is provided with a groove 216 (Figure 6). Cooperating with groove 216 is a set screw 217 or the like which has a reduced end seating in groove 216 and is adjusted to restrain shaft 177 against endwise movement. Shaft 177 extends outwardly of housing 1, and may be actuated in any desired manner, but I preferably employ the following mechanism for operating it. A lever 218 is rigidly secured to shaft 177 and carries a swivelled member 219. A control wire 221 is received in an aperture in member 219 and is secured therein by means of a set screw 222 or the like. Control wire 221 is enclosed in a flexible housing and is led up to a convenient operating location in the vehicle and is provided with an actuating knob 224. The parts are shown in Figure 9 in "neutral" position, with the forward and reverse positions being indicated in dotted lines.

If desired, frictional detent means, or other suitable mechanism, may be associated with the parts for yieldingly holding them in their selected positions, but I preferably employ a spring detent (Figure 1) which takes the form of a resilient wire 226 seating in a groove 227 formed in the splines of shaft 143. The splines formed in sleeve 149 are discontinued in the rear portion of the latter as shown in Figure 1 to provide a smooth cylindrical portion 228. Formed in cylindrical portion 228 are three grooves 229, which cooperate with wire 226 to hold sleeve 149 in its various selected positions against inadvertent displacement.

The parts are so designed, that when shaft 177 has been oscillated to bring sleeve 149 with the teeth 152 thereof out of engagement with teeth 113 formed on cage member 136, lever 176 is simultaneously actuated to cause it to be withdrawn from latching engagement with member 165. When the parts are arranged in this condition, and the driving shaft is accelerated, the primary clutch couples shafts 5 and 11 as previously explained, and the resulting rotation of gear 141 produces counter-clockwise rotation of internal gear 158, and clockwise rotation of the cage members and sleeve 129. Clockwise rotation of cage member 137 does not produce similar rotation of shaft 143, due to the disengaged condition of clutch member 149, and driving shaft 5 may accordingly be accelerated to any desired speed without transmitting torque to shaft 143. If the sleeve 129 is accelerated sufficiently, under these conditions, the secondary clutch mechanism will be engaged as previously explained, but the only effect of such engagement is to cause shaft 11, cage members 127 and 136, and internal gear 158 to be driven in unison, without transmitting torque to driven shaft 143.

*Reverse drive*

The gear mechanism employed for effecting forward torque multiplying drive is also utilized to obtain reverse drive. Cage member 127 is locked against rotation when reverse drive is employed, and to this end, the periphery thereof is provided with a plurality of teeth 231. Cooperating with teeth 231 is a latch member 232 which is preferably formed as an integral part of lever 176.

When it is desired to provision the mechanism for reverse drive, shaft 177 is oscillated sufficiently to cause latch member 232 to enter the space between two adjacent teeth 231 formed on cage member 127, thereby locking both cage members and sleeve 129 against rotation. Oscillation of shaft 177 in this manner is preferably designed to cause lever 176 to be withdrawn from the particular notch 167 with which it is engaged in member 165, and to simultaneously shift sliding clutch 149, into a position where the teeth 152 thereof are engaged with internal teeth 179 formed on the inner wall of sleeve 157.

With shaft 177 oscillated in this manner, the parts are disposed in reverse drive condition, and acceleration of the driving shaft causes the primary clutch mechanism to automatically couple shafts 5 and 11 in the manner previously described, and clockwise rotation of pinion 141, carried thereby, produces counter-clockwise rotation of planet gears 139 about their axes. The axes of planet gears 139 are restrained against movement because of the locked condition of the cage members at this time. Counter-clockwise rotation of planet gears 139 produces similar rotation of internal gear 158, and driven shaft 143 to which it is coupled by clutch member 149. In view of the fact that sleeve 129 is held stationary, the secondary clutch mechanism is maintained in disengaged or inoperative condition regardless of to what extent shafts 11 and 143 are accelerated in reverse drive.

*Amplified motor-braking*

With the present power transmitting mechanism installed in a motor vehicle or the like, direct drive or high gear motor braking during normal operating conditions is obtained in the manner previously explained. Under some conditions, for example in descending long mountain grades, it is desirable to materially augment the action of brake mechanism by causing the momentum of the vehicle to be applied to the engine through the torque multiplying mechanism. Under normal coasting operating conditions, internal gear 158 is allowed to over-run without applying torque to the engine when the secondary clutch is disengaged, and I have therefore provided means that may be selectively employed to hold internal gear 158 stationary at will, in order to impose the braking effect of the engine upon the load.

This mechanism may take any desired form but I preferably provide internal gear 158 with a smooth outer face 239, which is encircled by, and cooperates with a brake band 241. Band 241 is preferably constructed of spring steel and is designed to have sufficient inherent resilience to firmly grip face 239 when it is not under the influence of the expanding mechanism to be presently described.

One end of band 241 is looped over and anchored to the reduced extremity 242 (Figure 6) of one of the cap screws 121 employed to secure bearing support 122 within housing 1. Band 241 preferably consists of three convolutions, disposed side by side on the outer face of internal gear 158, and the other end thereof is provided with a radially extending portion or finger 244 that is disposed in a recess 245 formed in housing 1. Portion 244 of band 241 is adapted to cooperate with a cam surface 246 provided by preferably milling or recess in a shaft 247 journalled in housing 1. In Figure 6, the brake band is shown in disengaged or expanded condition.

Shaft 247 (Figure 7) is provided with a reduced portion 248. A cap screw 249 is threaded into housing 1 and its tapered extremity loosely engages in portion 248 of shaft 247 to hold the latter against axial displacement and yet permit oscillation thereof. Cap screw 249 is locked against rotation by means of a wire 251, extending through an aperture in the head thereof, and secured to a lug 252 formed on housing 1.

Shaft 247 protrudes from housing 1 and is actuated or oscillated in a manner to be presently set forth.

With internal gear 158 rotating in the direction indicated in Figure 6, oscillation of shaft 247 allows finger 244 to drop into the recess in shaft 247, and band 241, due to its inherent tendency to contract, frictionally grips face 239 and causes deceleration of internal gear 158. The frictional action of face 239 upon band 241 tends to cause band 241 to wrap itself around or more firmly grip face 239, therefore no positive contracting mechanism is required to cause band 241 to grip face 239 to efficiently bring internal gear to rest, and the actuating force applied to shaft 247 accordingly need only be of small magnitude.

Accordingly, if the vehicle is proceeding with the secondary clutch disengaged and the torque multiplying mechanism overrunning, shaft 247 may be oscillated to bring the recess of shaft 246 opposite finger 244, and thereby allow band 241 to contract and bring internal gear 158 to rest in the manner just described. This establishes a torque multiplying connection between shafts 143 and 11, and if the accelerator is depressed slightly so as to cause the engine to accelerate sufficiently to cause the primary clutch to engage, release of the accelerator will cause the braking effect of the engine, as amplified by the gear mechanism, to be applied to shaft 143. I preferably provide novel mechanism for obviating the necessity of depressing the accelerate pedal to secured geared motor braking, and this mechanism will now be described.

Control mechanism

With particular reference to Figure 9 of the drawings, a lever 255 having a split hub, is mounted on shaft 105 and is preferably rigidly secured thereto by means of a cap screw 256 which serves to frictionally grip shaft 105 between the bifurcations of lever 255. I preferably mount lever 255 upon shaft 105 in this manner so as to adjustably associate the parts for a purpose that will hereinafter appear, but it is to be understood that any other type of means for adjustably securing lever 255 to shaft 105 may be employed if desired without departing from the spirit of the present invention.

A detent member 257 is guided for movement lengthwise of lever 255 by means of a bracket 258, and the upper end thereof is connected to a controlling member 259 which is pivotally associated with the upper end of lever 255. The lever end of member 257 is adapted to be selectively positioned in recesses 261, 262, 263 and 264 formed in a sector member 265, which is preferably secured to housing 1. Lever 255, and shaft 105, are accordingly adapted to be held in four different selected positions, and with the parts disposed in the positions illustrated in Figure 9, with detent 257 disposed in recess 262, and with the engine operating at idling speed, fork 104 and throwout assemblies A and B assume the position shown in Figure 1. If desired, lever 255 may be pivoted to the vehicle frame.

With lever 255 shifted so as to dispose detent 257 in recess 261 of member 265, the inner ends of levers 78 of the primary clutch mechanism are disposed to the left of the position shown in Figure 1, so as to declutch the latter, or prevent the primary clutch from automatically engaging in response to acceleration of shaft 5.

When lever 255 is shifted to the right to bring detent 257 into engagement with recess 263, the inner ends of levers 78 of the primary clutch mechanism are permitted to move to the right of the position in which they are illustrated in Figure 1, under the action of springs 37, and allow the clutch to be engaged, at or below idling speed.

When lever 255 is shifted so as to dispose detent 257 in recess 264, throwout assembly B is brought into cooperation with levers 78 of the secondary clutch mechanism and causes the latter to be declutched, or if the secondary clutch does not happen to be engaged at this time, levers 78 are disposed so that automatic engagement of the secondary clutch, in response to acceleration of sleeve 129, is prevented from being effected.

Lever 255 accordingly constitutes a common control for the primary and secondary clutch mechanisms, and it is preferably provided with a further control organization for coordinating the action of the secondary clutch with that of the brake mechanism associated with internal gear 158, and to this end, lever 255 is provided with a lever portion 266, preferably extending downwardly below shaft 105. Pivotally secured to lever 266, by means of a clevis 267, is a link 268. Link 268 carries a clevis 269 at its other end, which is connected to a bell crank lever 271, and the latter is pivotally supported on housing 1 in any suitable manner. Interconnecting bell crank 271, and a lever 272 secured to shaft 247, is a link 273. Cam shaft 247 is thereby connected for synchronous actuation with lever 255, and cam 246 is preferably so designed that when lever 255 is disposed with detent 257 in recesses 261, 262, or 263, or member 265, brake band 241 is held in expanded or released condition, and when lever 255 is located with detent 257 disposed in recess 264, brake band 241 is permitted to contract and lock gear 158 against rotation. This is more clearly illustrated in Figure 6, wherein the parts of shaft 247 which cooperate with finger 244 during operation of lever 255 are designated by the detent reference characters 261, 262, 263 and 264. Brake band 241 is accordingly only applied to gear 158 when the secondary clutch is manually disengaged.

With the parts disposed in the positions they assume in Figure 9, knob 224 may be manipulated to provision the mechanism for automatic forward and reverse drive, and the parts may also be shifted into neutral. These operations take place in precisely the same manner as previously described.

The provision of the mechanism with the control mechanism that has just been described renders the mechanism more flexible and enables it to perform further highly important functions and operations, and these will now be set forth.

In the event the vehicle in which the mechanism is installed is starting to descend a long mountain grade, or like instance, and the transmission is operating in direct or indirect drive, and it is desired to augment the vehicle brake mechanism by the braking effect of the engine, as amplified by the torque multiplying mechanism, lever 255 is shifted to bring detent 257 into recess 264. This operation positions throwout assembly B so as to prevent the secondary clutch from automatically engaging, and causes gear 158 to be brought to rest under the influence of brake band 241. Also, if the secondary clutch is disengaged and the parts are overrunning at this time, operation of lever 255 in this manner serves to manually engage the primary clutch thereby establishing a two way coupling between shafts 5 and 11 and avoiding the necessity of accelerating the engine. In the event that the secondary clutch is automatically engaged at this time, operation of lever 255 in this manner declutches it and disconnects the direct drive that exists between shafts 11 and 143 through the secondary clutch.

Deceleration of internal gear 158 under the influence of band 241 causes planet gears 139, which were previously rotating as a unit in clockwise direction with internal gear 158, to commence to planetate clockwise within it. Clockwise planetation of gears 139 causes them to drive pinion 141, and the prime mover coupled therewith through the primary clutch, in a clockwise direction, imparting a speed of rotation thereto that is greater than that of shaft 143. When internal gear 158 is brought to rest under the influence of brake band 241, a torque multiplying coupling exists between shafts 11 and 143, and brings the coasting tendencies of the vehicle under the control of the braking effect of the engine as amplified by the torque multiplying mechanism. As the throttle of the engine is usually disposed in a position corresponding to engine idling speed under such conditions, the braking effect obtained is of considerable magnitude.

*Permanent torque multiplying coupling operation*

In ascending long mountain grades, that are too steep for the engine to handle the vehicle in direct drive, it is desirable to prevent the automatic transition from indirect to direct drive from taking place, so that the engine may be utilized to propel the vehicle through the torque multiplying mechanism, at speeds in excess of that corresponding to secondary clutch engagement speed so as to avoid improper and undesirable slippage of the latter.

In order to provision mechanism for this operation, the parts are shifted with detent 257 engaged with recess 264 in precisely the same manner described in connection with the motor-braking provisioning operation just described. Under these conditions, shaft 143 may be driven by and accelerated through pinion 141, planet gears 139, and stationary internal gear 158 to any desired speed without producing automatic engagement of the secondary clutches.

Although band 241 holds internal gear at rest under these conditions, it is superfluous insofar as forward drive is concerned, because, as has been previously explained, clockwise rotation of pinion 141 causes planet gears 139 to react against and tend to produce counter-clockwise rotation of internal gear 158. Counter-clockwise rotative tendencies of internal gear 158 causes rollers 168 to lock it against rotation. The secondary clutch and the brake may therefore be separately operated to provision the mechanism for the operation just described, but they are preferably interconnected for the purpose of simplifying the design of the control mechanisms therefor. Band 241, under these conditions, restrains movement of gear 158 in a counter-clockwise direction, and therefore should a reversal of drive occur, and shaft 143 tend to over-run with respect to shaft 11, when the parts are disposed in this position, amplified motor braking is obtained. Operation of the brake for the internal gear and the coupling for the secondary clutch simultaneously in this manner therefore provisions the mechanism for permanent low gear operation, and at the same time provisions it for amplified motor braking and the control mechanism is accordingly simple in design.

However, should it be undesirable, in the particular type of drive involved, to apply a braking influence to gear 158 when the secondary clutch is disconnected for obtaining a permanent torque multiplying drive, the secondary clutch and shaft 247 may be independently actuated, and it is to be understood that this method of their control is also embraced by the present invention.

*Manual coupling of driving and intermediate shafts*

When the vehicle engine, or other prime mover is stationary, and the parts are in the positions shown in Figures 1 and 9, the primary clutch is automatically disengaged and shafts 5 and 11 are disconnected. When it is desired to couple shafts 5 and 11 under these conditions, lever 255 is operated to bring detent into recess 263, thereby allowing spring 37 to bring the plates of the primary clutch mechanism into driving engagement. If the vehicle is then towed or coasted to turn the engine over for the purpose of cranking it, the initial speed imparted to shaft 143 merely results in internal gear 158 over-running in a clockwise direction, and since planet gears 139 planetate about stationary pinion 141 under these conditions, they do not transmit torque thereto, and shafts 11 and 143 accordingly remain in disconnected condition. As the speed of shaft 143 is accelerated in response to towing or coasting the vehicle, sleeve 129 is likewise accelerated, and when the speed is sufficiently great, the secondary clutch engages and directly couples shafts 143 and 11, in the manner previously described. A direct coupling now exists between shafts 143 and 5, and the engine is turned over or cranked. When the engine starts in response to the cranking operation, lever 255 may be returned to automatic position with detent 257 engaged in recess 262.

On the other hand, if the engine is dead, and it is desired to transmit torque from shaft 143 to shaft 11 without accelerating shaft 143 under the influence of coasting or towing the vehicle, sufficiently to cause the secondary clutch to engage, lever 255 may be moved to dispose detent 257 in notch 264. This operation produces manual engagement of the primary clutch, and at the same time restrains internal gear 158 against rotation. When the vehicle is towed or coasted under these conditions, torque is transmitted from shaft 143 through planet gears 139 and pinion 141 to shaft 11, and from shaft 11 through the manually engaged primary clutch to shaft 5.

With reference to the primary clutch, lever 255 is normally disposed with detent 257 located in recess 262 to hold the parts in the positions shown in Figure 1 of the drawings when the primary mover is operating at idling speed or is stationary. When facings 19 and 20 have become thin, as the result of particles thereof wearing away during operation, and cause the idle release plate clearance to become too great, throwout bearing assembly A is moved slightly to the right of the position in which it is shown in Figure 1, by loosening cap screw 256 and adjusting lever 255 on its shaft, or by adjusting detent plate 265 angularly in any suitable manner, in order to dispose automatic plate 22 closer to the flywheel and establish proper plate clearance for idle release conditions. In co-pending application, Serial No. 595,184, filed February 25, 1932, adjusting mechanisms are disclosed that have proved to be highly successful in practice, and I contemplate using these adjusting mechanisms in the present invention. When facing-wear has been compensated for several times by periodically adjusting the throwout bearing assembly further to the right, fingers or levers 78 may be allowed to move to the right to such an extent under some conditions, that they take undesirable angular positions. This condition is readily remedied, or compensated for by adjusting nuts 75 an equal amount, and sufficient to bring levers 78 into the proper positions desired. The external adjusting mechanism previously referred to may then be manipulated to establish proper idle release clearance between the plates and clearance gauges may be introduced between the cover and the flywheel and inserted between facing 19 and the flywheel face to ascertain if the plate clearance is correct. The normal plate wear compensating adjustment however, is made externally of the clutch housing by adjusting the angular position of shaft 105, and therefore the adjustment does not in any way affect the adjusted positions of nuts 75, and consequently the angular relation of the plates.

On the other hand, if the facings are of such character that they undergo great dimensional changes when wear occurs, spacing members 25 may be removed, and thinner spacers inserted so as to dispose cover 23, automatic plate 22 and reaction plate 29 close to the flywheel, to thereby establish proper idle release clearance without varying the degree of pressure build up in springs 37. To facilitate this adjustment, spacer 25 may be made in sections as laminated shims if desired.

Referring to the secondary clutch, adjustment thereof to compensate for wear of the facings may be made by adjusting screws 184 so as to dispose the automatic and reaction plate assembly closer to member 183, or cover 23 may be adjusted in the manner described in connection with the primary clutch to establish proper release plate clearance.

As previously explained, knob 224 may be operated to place the transmission gearing in neutral, so as to prevent automatic engagement of the primary and secondary clutches from establishing a driving connection between shafts 5 and 143, and thereby allow the engine or other prime mover to be idled at speeds in excess of normal idling speed. In the winter, when it is desired to idle the engine in this manner, and yet avoid that drag of the gears due to congealed gear lubricants, lever 255 may be operated to dispose detent 257 in recess 261. Movement of lever 255 into this position produces disengagement of the primary clutch in the manner previously described, thereby removing shafts 11 and 143 of all driving influences.

Although I have illustrated and prefer to employ individual controls for the clutch mechanisms and the forward-reverse mechanism, it is to be understood that they may be associated with a single controlling mechanism if desired without departing from the spirit of my invention. For instance, control knob assembly 224 may be mounted on lever 255 if desired so that an operator may control the mechanism with a single hand. Moreover, control assembly 244, when so associated with lever 255, may be so designed that the operator need only grasp a single element for controlling the mechanism, for instance, control assembly 224 may be designed to oscillate about lever 255 as an axis, if desired.

It is therefore seen, that with the present drive mechanism the necessity for a clutch pedal and gear shift lever is entirely dispensed with, and the number of controls in the driver's compartment of the vehicle materially reduced, a brake pedal and accelerator constituting the entire control mechanism for the normal operation of the vehicle for forward drive, reverse drive being obtained by a simple dash controlled device.

Due to the smooth operating characteristics of the primary automatic clutch mechanism, and its ability to smoothly transmit torque efficiently under slipping drive conditions, if called upon, it could in fact be employed to directly couple shafts 5 and 143, and would stand up under these conditions in view of its durable nature. Therefore, the ratio of the gearing interposed between shafts 11 and 143 may have a fairly low value of torque multiplication and yet permit the vehicle to be started on steep grades with perfect ease. This is particularly a desirable characteristic for the reason that when the vehicle is being accelerated through the intermediary of gears 139 and 141, the relative speed of shafts 11 and 143 is not excessive, and when shaft 143 reaches sufficient speed, and the secondary clutch operates, the latter is not called upon to bring two shafts into synchronism that are rotating at widely variant speeds, and it therefore can smoothly and efficiently perform the functions required.

While the mechanism shown provides only a single gear reduction, which is entirely satisfactory in a light vehicle of the pleasure car class, it is to be understood that in heavy duty vehicles, such as trucks, busses, rail cars and the like, two or more of the transmission units disclosed would be disposed in series behind a single primary clutch to give two or more gear reductions, and in such case the centrifugal weights of the first secondary clutch mechanism would be so designed as to move into full engagement considerably before the centrifugal weights of the second secondary automatic clutch mechanism came into play, so that a direct drive would be established between the shaft coupled by the first secondary automatic clutch mechanism while torque is transmitted between the shaft coupled by the secondary clutch mechanism through the gear reduction. In such a power transmitting mechanism final conditions are reached when the primary automatic clutch mechanism and all of the secondary automatic clutch mechanisms are fully engaged and a direct drive is established from the engine to the rear wheels of the vehicle.

In practice, the secondary or direct coupling clutch operated by weights 56a is preferably designed so that complete engagement thereof is attained comparatively rapidly, and full engagement occurs with a speed difference of approximately ten to twelve percent or less, or approximately one tenth of the speed difference in which slipping drive conditions exist in the primary clutch so that the opportunity for prolonged slipping during load conditions under which the direct coupling clutch is in slipping drive engagement as might occur under unusual conditions in practice, is reduced to a minimum.

Referring to the novel power transmitting mechanism illustrated in Figure 1 of the drawings, the secondary automatic clutch mechanism operates solely in response to the speed of rotation of shaft 143, which may, for all purposes, be considered as the final driven shaft because the torque amplifying coupling is disposed between it and the prime mover. The secondary clutch mechanism may be so designed as to operate in response to the speed of shaft 11, and this organization is intended to be embraced by the present disclosure, because, in view of the fact that it in such an event would be carried by intermediate shaft 11, which is definitely coupled with the driven shaft through the interposed gear mechanism, it would therefore operate proportionally to the speed of the driven shaft. This is a highly desirable feature for the reason that operation of such secondary clutch mechanisms is entirely independent of the speed of rotation of the prime mover, but is dependent upon the speed of the final driven shaft, and, since the speed of the final driven shaft or the load is the essential factor in the operation of the secondary automatic clutch mechanism, such operation should take place when the load has been accelerated to a speed where the prime mover has developed sufficient power to cause further acceleration of the load without the aid of torque amplifying mechanisms. Therefore, secondary clutch operation should not depend solely upon the speed of the prime mover, but should be correlated with the speed of the load and the prime mover.

Moreover the present organization allows the hold-back springs and centrifugal weights of the secondary clutch mechanisms to be of substantially similar design to those employed in the primary clutch mechanism, whereas, if the secondary clutch mechanism were dependent upon, and wholly responsive to the speed of the prime mover, it would be necessary to specially design the springs and weights for operation at a higher speed than that of the primary automatic clutch mechanism driven by the prime mover. Otherwise, upon acceleration of the prime mover, both clutch mechanisms would operate almost simultaneously to directly couple the prime mover with the intermediate shaft 11 and the final driven shaft, and the torque amplifying coupling therefore could never be utilized.

In a vehicle provided with power transmitting mechanisms of the character that I have disclosed, if it is desired to start the vehicle on a grade, the engine is accelerated and the primary automatic clutch mechanism operates to establish a slipping torque transmitting coupling between the prime mover and the intermediate shaft as previously explained. Rotation of the intermediate shaft, through the medium of the interposed gearing, causes an amplified torque to be transmitted to the driven shaft. Through the slipping drive coupling existing between the prime mover and the load, the prime mover is allowed to accelerate and operate efficiently on a relatively high point on its speed-torque curve to develop adequate power to start the vehicle, even though the interposed gear mechanism may have only a low torque amplification. During this operation, the secondary automatic clutch mechanism is inactive since it relies for its actuation upon the speed of the load, and the only connection existing between the prime mover and its load is that established by the interposed gearing, which supplies sufficient torque amplification to enable the engine to effectively handle the load under these conditions.

By way of a concrete example, assuming that the novel transmission mechanism herein disclosed is incorporated in a motor vehicle, and the transmission gearing has a reduction of 2 to 1, the primary clutch mechanism initiates operation at an engine speed of 500 revolutions per minute, completing its operation at an engine speed of 1000 revolutions per minute, a non-slipping drive with torque amplification is thereby established between the engine and the rear wheels when the engine is operating substantially at 1000 revolutions per minute. With normal rear axle gear ratios, this results in a vehicle speed of 10 miles per hour, although it is to be understood that completion of primary clutch operation may take place at a higher or lower vehicle speed, depending upon whether the vehicle is ascending or descending a grade or is proceeding on a level surface.

Under these conditions the secondary clutch mechanism, due to the fact that it is actuated in accordance with the speed of the driven shaft and vehicle wheels coupled thereto, may be designed to operate to directly couple the engine and rear wheels to any desired vehicle speed, for instance 15 miles per hour, and such operation is therefore entirely independent of speed fluctuations of the engine.

Referring now to Figures 10, 11 and 12 of the drawings, I have illustrated another form of automatic power transmitting mechanism embodying my invention. In this form of the invention the primary and secondary clutch mechanisms are of a somewhat modified form, and the gear mechanism is of a countershaft design, as distinguished from the planetary mechanism utilized in the mechanism just described.

With continued reference to these figures, a modified form of flywheel 7a is secured to shaft 5 and has an interiorly splined cylindrical member 301 secured thereto by means of cap screws 302 or the like. Secured to member 301, by means of cap screws 303 is a plate 304 and a primary clutch cover 305. Automatic plate 22a is driven by tongues 306 (Figure 12), struck out of cover 305 and which are slidably associated with recesses 307 formed in automatic plate 22a. Hold back spring 36a acting through bolts 32a urge plates 22a and 29b towards each other and reaction plate 29b is curved toward member 304 by means of a plurality of compression springs 308. Movement of reaction plate 29b towards member 304 is normally limited by means of a plurality of bolts 309 having nuts 311 turned thereon. The nut and bolt assemblies are preferably associated with and apply their limiting forces to cup member 312 and 313, seating in apertures located in plate 29b and cover 305 respectively. Nuts 311 are preferably adjustably held on bolts 309 by means of cotter pins 314 or the like.

The lever portions of automatic weights 56b extend through apertures in cover 305 and are adapted to rock outwardly in response to the speed of shaft 5 in the manner described in connection with the first form of my invention, and grip driven disc 17a between automatic plate 22a and member 304. Weights 56b however stop against a cylindrical member 315 which also reinforces cover 305 and which is secured thereto by means of a spot welding operation or the like.

In this form of my invention hub 15b of the primary clutch mechanism is splined to a sleeve 316 which is rotatably supported in a bearing assembly 317. Bearing assembly 317 is secured in a bearing support 318 which is secured to housing 1a by means of cap screws 319. Shaft 11a extends within sleeve 316 and is journalled for rotation therein within roller bearing assemblies 321 or the like, which are maintained in proper spaced relation thereon by means of a spacer sleeve 322.

Shaft 143a is journalled at its front end on recess 323 formed in shaft 11a and its rear end is carried in a bearing assembly 324. Sleeve 316 is provided with preferably integrally formed external gear teeth 325 which are adapted to mesh with gear 326 carried by cluster gear member 327. Member 327 is mounted on a roller bearing assembly designated generally at 328 which is carried by a shaft 329. The forward end of shaft 329 is supported in an aperture in housing 1a and its rear end is supported in a support 331 which is clamped and held in position between housing 1a and a rear housing member 332, which supports bearing 324, by means of cap screws 333. Shaft 329 is restrained against displacement and rotation in support 331 by means of a plate 334 which seats in a recess in shaft 329 and is held in place by means of a cap screw 335 tapped into support 331.

Meshing with a gear 336 formed on member 327 is a gear 337 which is formed on a cylindrical member 338. With particular reference to Figure 11, a plurality of overrunning clutch rollers 339 are located in pockets formed in member 338 and cooperate with the outer cylindrical face of race member 341 formed on shaft 11a. Plungers 342, acted upon by springs 343, are adapted to cause rollers 339 to cooperate with members 338 and 341 so as to lock the latter together when the speed of member 338, when rotating in a clockwise direction tends to overrun member 341, and to allow member 341 to overrun member 338 when such tendency is manifested.

Members 338 and 341 are also provided with internal teeth 345 and 346 respectively, which are adapted to be selectively engaged by teeth 347 formed on sleeve member 149a. Member 149a is adapted to be slid axially on shaft 143a by means of fingers 176a mounted on shaft 177a, and is provided with spur gear teeth 348, which are adapted to be brought into mesh with a reverse idle gear 349. Gear 349 is driven by a gear 351 formed on member 327 and is journalled in a bushing 352 frictionally fitted into an aperture in support 331, and is restrained against axial displacement therein by means of a split ring 353 sprung into shaft portion 354 of gear 349.

The secondary clutch in this form of the invention is of a somewhat modified form, and although no mechanism is shown for delaying its engaging action, it is to be understood that a delaying mechanism similar to that employed in the secondary clutch illustrated in Figure 1 may be associated with it if desired without departing from the spirit of the present invention. The secondary clutch is supported on a disc-like member 355 which, along with a spring thrust member 356, is mounted on shaft 11a. Members 355 and 356 are restrained against rotation and endwise movement on shaft 11a by means of a key 357 and a pair of split rings 358 and 359 which are sprung into grooves in shaft 11a.

Automatic plate 22b is driven by member 355 through the medium of a plurality of square shanked studs 361 which are threaded into member 355 and are slidably associated with the walls of recesses 362 formed in plate 22b. Reaction plate 29c is urged toward a plurality of stop screws 363, threaded into member 355, by means of springs 364, which react against thrust member 356. Screws 363 may be adjusted to establish proper idle release clearance between the plates and are adapted to be locked in place by means of lock nuts 365.

Automatic weights 56c are adapted to operate in response to acceleration of shaft 11a and grip disc 17b between plates 22b and disc 355 and when they have rocked into the outermost positions they are preferably adapted to lie in contact with a flange 366 formed on reaction plate 29c. Disc 17b is annular in form and is provided with external teeth 367 which mesh with the splines formed in member 301. The secondary clutch is therefore responsive to the speed of rotation of shaft 11a and is adapted to directly couple the latter to shaft 5.

With the engine or other prime mover operating substantially at or below idling speed the automatic clutches assume the condition illustrated in Figure 10, and with sleeve or clutch member 149a disposed in the position illustrated in this figure, the mechanism is provisioned for automatic forward drive and this operation is as follows.

When shaft 5 is accelerated to a predetermined speed, the primary clutch mechanism smoothly engages and establishes a driving connection between shaft 5 and sleeve 316, through the intermediary of disc 17a. Assuming that the direction of rotation of shaft 5, when viewed from the left hand side of Figure 10, is clockwise, gear 325 causes gears 326 and 336 to rotate in a counterclockwise direction. Counterclockwise rotation of gear 336 imparts clockwise rotation to gear 337, and through the medium of overrunning clutch rollers 339 a similar rotation is imparted to shaft 11a, sleeve 149a and shaft 143a. A torque multiplying connection is thereby automatically established between shafts 5 and 143a, and the latter is driven at a speed reduction that depends upon the gear ratios selected.

When shaft 11a is accelerated to a predetermined speed through the torque multiplying drive just described, the secondary clutch mechanism engages and establishes a driving connection between shafts 5, 11a and 143a. Upon initiation of secondary clutch engagement, member 341, carried by shaft 11a, tends to overrun with respect to member 338, and rollers 339 release members 338 and 341 and allow this action to take place. The torque multiplying coupling between shafts 5 and 11a is thereby automatically disconnected, and shafts 11a and 143a are smoothly brought into synchronism with shaft 5 and the influence of the secondary clutch. A direct drive is thereby established between shafts 5 and 143a, and when the transmission is operating in this manner, gears 325, 326, 336, 349, 351, and 337 rotate in view of the connection to shaft 5 through the primary clutch mechanism, but they do not transmit driving effects to shaft 143a under these conditions, and as the tooth pressure is of low value the resistance or drag imposed on shaft 5 through this idling operation is negligible.

When operating a vehicle provided with a transmission of this character in direct drive, the direct braking effect of the engine is imposed on shaft 143a every time the accelerator is released, but when the speed of shaft 143a drops below the engaging speed of the secondary clutch, release of the accelerator causes shaft 143a to overrun with respect to member 338 in view of the releasing action of rollers 339 which is manifested under these conditions as soon as the parts commence to overrun, the engine drops to idling speed and the primary clutch automatically disengages, thereby completely disconnecting shafts 5 and 143a. Under normal driving conditions it is entirely satisfactory to have the parts operate in this manner, but in some instances, as when descending long grades, it is desirable to impose the braking effect of the engine, as applied by the torque multiplying mechanism upon the load.

When this condition arises, shaft 177a may be oscillated by operating knob 224, so as to slide member 149a and bring its teeth 347 into mesh with teeth 345 formed on member 338. This operation cuts out the secondary clutch operation because shaft 11a is thereby disconnected from shaft 143a, and also establishes a direct drive from shaft 143a to member 338 and the gear train associated therewith.

The mechanism may also be provisioned in the manner just described when it is desired to handle a heavy load at fairly high speed, as for instance when ascending a very steep grade with a motor vehicle. When the mechanism is developing power in this manner, the torque multiplying connection between shafts 5 and 143 is maintained irrespective of the speed that may be attained by shaft 143a or any of the other parts for the reason that although rollers 339 connect member 338 to shaft 11a with the result that the secondary clutch is automatically engaged when its engaging speed is attained, such engagement and resultant coupling of shafts 5 and 11a is ineffective to transmit power from shaft 11a to 143a because rollers 339 are ineffective to transmit power from shaft 11a to member 338.

When it is desired to bring the mechanism into neutral, shaft 177a is oscillated so as to bring member 149a with teeth 347 thereof into the space between teeth 345 and 346 formed on members 338 and 341 respectively. When shaft 5 is accelerated with the parts in this condition, the primary and secondary clutches automatically engage when their respective engaging speeds are attained, but their action is ineffective to effect a transmission of power from shaft 5 to 11 because member 149a is disconnected from the driving parts and these conditions.

By oscillating shaft 177a so as to shift member 149a with the teeth thereof in engagement with gear 349, reverse drive is obtained. With the mechanism provisioned in this manner, clockwise rotation of gear 325, in response to engagement of the primary clutch produces counter-clockwise rotation of gears 326 and 351. Gear 351 drives gear 349 in a clockwise direction, and gear 349 in turn rotates gear 348 and shaft 143a in a counter-clockwise direction or in a direction that is reverse to that obtained by shifting member 149a with teeth 347 thereof into engagement with teeth 345 or 346. During the process of shifting member 149a for reverse drive, teeth 347 thereof were brought out of engagement with teeth 346 and therefore engagement of the secondary clutch, when shaft 11a attains the proper engaging speed, is ineffective to tend to establish a direct connection between shafts 5 and 143a.

Knob 244 of the Bowden wire control organization employed in connection with this form of my invention therefore will have four positions, i. e., reverse drive, forward drive, neutral, and amplified motor braking drive position, and a detent assembly of the type utilized in the mechanism illustrated in Figure 1 may be used to hold the parts in their selected positions, if desired. Moreover, it is to be understood that a suitable indicating device may be used with the control assembly to instruct the operator as to how to provision the mechanism for the various modes of operation just described.

In Figure 13 of the drawings, I have illustrated a further modified form of automatic transmission, wherein both the primary and secondary clutches are responsive to the speed of rotation of shaft 5, and wherein a modified form of gear mechanism is utilized.

With continued reference to this figure, housing 1b is of a somewhat different configuration than those previously illustrated, and it is provided with strengthening webs 361 to reenforce it against flexing in response to the forces which are set up in it during operation. Flywheel 7b is somewhat heavier than the one illustrated in Figure 10 and has air inlet and exhaust ventilating openings 362' and 363' formed therein.

A comparatively heavy member 364' is secured to flywheel 7b by means of cap screws 365'. Member 364' supports both the primary and secondary clutches, their covers 305 being secured thereto by means of cap screws 366'.

The clutches employed in this form of my invention are substantially identical in form, except that weights 56b of the secondary clutch stop against the inner wall of the flywheel, and the holdback springs 36a of the secondary clutch are stronger than those of the primary clutch for a purpose that will appear hereinafter. As the primary and secondary clutches are similar to the primary clutch illustrated in Figure 10, like reference characters have been applied to corresponding parts and the description of their function will not be repeated. The hub of driven disc 17a of the secondary clutch is splined on shaft 11a and therefore the primary and secondary clutches are adapted to operate consecutively in response to the speed of rotation of shaft 5 to connect the latter first with sleeve 316, and then with shaft 11a.

Gear teeth 325, formed on sleeve 316, mesh with internal teeth 368 preferably formed on a cylindrical member 369, and the latter is rotatably supported in a cylindrical portion 371 of housing 1b on bearing assemblies designated generally as 372. Member 369 is located eccentric to the axis of the mechanism as shown, and is provided with external teeth 373 which mesh with internal teeth 374 formed on a second cylindrical sleeve member 375. Member 375 is supported in a concentric portion 376 of housing 1b, in bearing assemblies 377 and is provided with internal teeth 378 and 379 which are adapted to cooperate with teeth 347 formed on member 149a, and idle gear 349, respectively. Supported in member 375, and restrained against axial movement therein by means of a pair of split rings 380 sprung into grooves therein, is a race member 381 with which rollers 339 and plungers 342 cooperate. Member 381 is restrained against rotation with respect to member 375 by means of a cap screw 382 threaded into the latter and engaging in a recess in member 381.

When shaft 5 is accelerated to a predetermined speed, the primary clutch couples shafts 5 and 11a in the manner previously described and produces clockwise rotation of gear 325. With the gear elements in the positions shown in Figure 13, gear 325 drives gears 368, 373, and 374 in a clockwise direction which results in similar rotation of members 375 and 381. Clockwise rotation of member 381, through the action of rollers 339, imparts similar rotation to members 341a and 149a, and shaft 11a.

When a speed, predetermined by the strength of secondary clutch holdback spring 36a, is attained, the secondary clutch automatically engages and couples shafts 5 and 11a. When this action is initiated, rollers 339 free members 341a and 375, and the former commences to overrun with respect to the latter, and the secondary clutch brings shafts 143a and 11a into synchronism in a manner similar to that described in connection with the mechanism illustrated in Figures 10, 11 and 12.

By sliding member 149a into position with teeth 347 thereof out of engagement with teeth 346 the mechanism is disposed in neutral, and by moving teeth 347 into engagement with teeth 378 of member 375, the device is provisioned for amplified or geared motor braking, and the permanent torque multiplying coupling operations described in connection with the mechanism illustrated in Figure 10. Shifting member 149a to the left, with its teeth engaging idle gear 349, provisions the mechanism for reverse drive.

Although I have illustrated the primary and secondary clutch mechanism of the mechanisms shown in Figures 10 to 13 inclusive, as being fully speed responsive in operation, it is to be understood that declutching mechanism may be utilized therewith if desired, without departing from the spirit of the present invention. In fact, the primary and secondary clutches illustrated in Figure 1 may, with but slight changes in their designs, be employed in the mechanism shown in Figures 10 to 13 inclusive, and the appended claims are intended to embrace mechanisms of this character.

When my novel automatic power transmitting mechanisms are utilized in heavy rail cars, trucks or busses, or any installation where a single gear reduction is insufficient to enable them to adequately handle the loads, they may if desired, be coupled in series as previously described, or have a manually operable transmission associated therewith for providing additional torque multiplications.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. In an automatic power transmitting mechanism, in sub-combination, a driving member and a driven member mounted for engagement and disengagement; means responsive to the speed of rotation of one of said members and adapted to bring said members into frictional engagement, and means for preventing actuation of said speed responsive means until said one member has attained a predetermined speed, comprising an axially movable member, having means operably associated therewith for yieldably resisting the movement thereof until a force of predetermined magnitude has been applied thereto, said last named means being operable after said predetermined speed is attained, to release said axially movable member and allow said first named means to bring said driving and driven members into engagement at a comparatively rapid rate.

2. In an automatic power transmitting mechanism, in sub-combination, a plurality of friction clutch mechanisms having frictional clutch elements and speed responsive means for producing frictional engagement of the clutch elements and each having an individual mechanism for causing frictional disengagement of the said clutch elements independently of the action of said speed responsive means; and common means for operating the disengaging mechanisms of at least two of said clutch mechanisms.

3. In an automatic power transmitting mechanism, a driving member; a driven member; a torque multiplying mechanism; means comprising a friction clutch mechanism for causing said torque multiplying mechanism to couple said members and amplify the torque transmitted from said driving member to said driven member; a second friction clutch mechanism associated with said mechanism and adapted to establish a direct drive between said shafts when it is engaged; each of said clutch mechanisms having frictional clutch elements, means responsive to the speed of rotation of one of said members for engaging the frictional elements of said second clutch mechanism, and means for disengaging the frictional elements of said clutch mechanism independently of the action of said first clutch and said speed responsive mechanism, whereby the drive through said torque multiplying mechanism may be readily established and maintained irrespective of the rotative speed attained by said one member.

4. The automatic power transmitting mechanism described in claim 3, wherein said speed responsive means is responsive to the speed of rotation of said driven member and is adapted to cause said second friction clutch mechanism to directly couple said driving and driven members.

5. The automatic power transmitting mechanism set forth in claim 3, wherein said torque multiplying mechanism is normally only effective to transmit torque from said driving member to said driven member; and wherein operation of said disengaging means is effective to actuate a braking means to render said torque multiplying mechanism effective to transmit torque from said driven member to said driving member.

6. The automatic power transmitting mechanism described in claim 3, in combination with mechanism for releasably holding said disengaging means in disengaged condition.

7. In an automatic power transmitting mechanism, in sub-combination, a driven member; a driving member; a low speed gear train operably associated with said members and normally establishing a driving connection therebetween, a one-way clutch interconnecting one of said members and a part of said gear train; means for directly coupling said members when said driving member attains a predetermined speed; and means for selectively coupling said driven member with said gear train part to thereby cut out operation of said one-way clutch and establish a two directional torque multiplying coupling between said members.

8. The mechanism described in claim 7, wherein said one-way clutch couples a part of said gear train and said driven member.

9. In an automatic transmission, a driving member; a driven member; a torque multiplying mechanism operably associated with said members and adapted to transmit torque therebetween; a control element associated with said torque multiplying mechanism and operable to vary the torque multiplication between said members when rotative efforts are applied to it; means for automatically applying rotative efforts to said element when parts of said torque multiplying mechanism attain a predetermined speed, comprising an automatic clutch having centrifugally operable mechanism for forcing the frictional parts thereof into engagement; means for limiting the magnitude of the effective forces set up by said centrifugally operable mechanism to a predetermined value, to thereby limit the pressure built up between said frictional parts to a substantially predetermined value; and means for preventing said centrifugally operable mechanism from forcing said frictional parts into engagement when it is desired to maintain the torque multiplication between said members at a constant value, said last named means being operable to inhibit clutch operation by exerting forces that do not exceed said predetermined force value, irrespective of the speed attained by said torque multiplying mechanism part.

10. The transmission described in claim 9, wherein the centrifugally operable mechanism of said automatic clutch is responsive to the speed of said control element.

11. The transmission described in claim 9, wherein said last named means is operable to disengage the frictional parts of said automatic clutch after they have become engaged under the influence of said centrifugally operable mechanism.

12. In an automatic transmission, in combination with a torque multiplying mechanism for transmitting torque from a driving member to a driven member and having a controlling element which is operable to vary the torque multiplication when rotative efforts are applied thereto; a friction clutch part carried by said element; a friction clutch part connected to said driving member; means for forcing said parts into frictional engagement when one of them attains a predetermined speed, comprising centrifugally operable mechanism mounted to rotate synchronously with said one part; resilient means for establishing a yielding engagement pressure between said parts when they have become engaged under the influence of said centrifugally operable mechanism, means for limiting the magnitude of the clutch engaging forces developed by said centrifugally operable mechanism to a predetermined value, to thereby limit the magnitude of the pressure built up between said parts; and means for moving said parts away from each other against the action of said resilient means when it is desired to prevent said centrifugally operable mechanism from automatically varying the torque multiplication.

13. The combination described in claim 12, wherein said centrifugally operable mechanism is supported for synchronous rotation with, and is responsive to variations in the speed of said controlling element.

14. The combination described in claim 12, wherein said last named means comprises a throwout device mounted for axial movement with respect to said driving member.

15. In an automatic transmission, in combination with a torque multiplying mechanism for transmitting torque from a driving member to a driven member and having a controlling element which is operable to vary the torque multiplication when rotative efforts are applied to it, a friction clutch part carried by said element; a friction clutch part connected to said driving member; resilient means associated with said parts and tending to force them into engagement; means for maintaining said parts disengaged against the action of said resilient means when said element is rotating below a predetermined speed; means for automatically forcing said parts together and building up pressure in said resilient means when said element is rotated substantially at said predetermined speed; and means for moving said parts away from each other against the action of said resilient means when it is desired to prevent said centrifugally operable mechanism from automatically varying the torque multiplication.

16. In an automatic transmission, a torque multiplying mechanism for transmitting power from a driving member to a driven member and having a controlling element which is operable to vary the torque multiplication when rotative efforts are applied to it; an automatic plate and a reaction plate mounted for synchronous rotation with said element and being axially movable with respect thereto; a driving disc disposed between said plates and connected to said driving member; resilient means for urging said reaction and automatic plates toward said controlling element; means for maintaining said reaction plate in a predetermined axial position against the action of said resilient means; centrifugally operable mechanism, adapted to act against said automatic plate and react against said reaction plate and force said automatic plate into engagement with said driving disc when said controlling element attains a predetermined speed; and means for moving said reaction plate away from said element, to thereby render said centrifugally operable mechanism ineffective to produce clutch engagement.

17. The transmission mechanism described in claim 16, together with a cover member secured to said element, and wherein the last named means of claim 16 comprises a plurality of levers connected to said reaction plate and cover.

18. In an automatic transmission, a driving member, an intermediate member and a driven member disposed in series and adapted to transmit power from a prime mover to a load; a primary automatic clutch operable to automatically couple said driving and intermediate members when said driving member attains a predetermined speed; a torque multiplying mechanism normally interconnecting said intermediate and driven members; means for automatically establishing a direct drive between said intermediate and driven members when certain conditions have been attained, comprising a secondary automatic clutch; said primary and secondary clutches being disposed in spaced axial alignment and having throwout mechanisms for disengaging them, and means disposed between said clutches and mounted for axial movement, for actuating the throwout mechanisms thereof.

19. The mechanism described in claim 18, wherein said last named means comprises a single device which is operable to actuate the throwout mechanism of both of said clutches.

20. The mechanism described in claim 18, wherein said last named means comprises a single operating device which is operable when it is in one position to disengage said primary clutch and when in another position it is operable to disengage said secondary clutch.

21. The mechanism described in claim 18, wherein said last named means is adapted to assume a primary clutch disengaging position, a primary clutch engaging position and a secondary clutch disengaging position.

22. In an automatic transmission, in sub-combination, a pair of automatic clutches disposed in spaced axial alignment, each of said clutches comprising driving and driven means and centrifugally operable means for engaging said driving and driven means, each of said clutches also having means for disengaging them, comprising a plurality of throwout levers, a pair of throwout bearings adapted to cooperate with said levers; and resilient means for maintaining said bearings in contact with said levers at all times.

23. The mechanism set forth in claim 22, wherein said resilient means acts against one of said bearings and reacts against the other of said bearings.

24. In an automatic transmission, a sleeve-like driving member; a shaft disposed within said driving member and adapted to rotate independently thereof; a driven member; a gear train associated with said driving member and a gear train part operable to transmit power therebetween; a one-way clutch interconnecting said gear train part, and said shaft; and means for selectively connecting said driven member to said shaft or to said gear train part.

25. The mechanism described in claim 24, wherein said means is operable to connect said driven member to another part of said gear train for establishing a reverse drive between said driving-member and said driven member.

26. The mechanism described in claim 24, wherein said means comprises an axially movable element having external teeth thereon which are adapted to be selectively meshed with internal teeth provided on said shaft and said gear train part.

27. The mechanism described in claim 24, wherein said gear train comprises a rotatably mounted spur gear assembly meshing with external teeth formed on said driving member and said gear train part.

28. The mechanism described in claim 24 wherein said gear train comprises an internal gear meshing with teeth formed on said driving member.

29. In an automatic transmission, a sleeve-like driving member; a shaft extending through said driving member; a driven member; a rotatably mounted internal gear meshing with teeth provided on said driving member; a second internal gear meshing with spur teeth provided on said first named gear; a reverse gear mounted for rotation and adapted to mesh with a second set of internal teeth provided on said second internal gear, and means for selectively connecting said driven member to said second internal gear or to said reverse gear.

30. The mechanism defined in claim 29, together with a one-way clutch for coupling said second internal gear and said shaft.

31. The mechanism defined in claim 29, wherein said means comprises an axially movable element having teeth thereon which are adapted to be meshed with internal teeth provided on said second internal gear or with said reverse gear.

32. In an automatic transmission, in sub-combination, driving and driven shafts disposed in axial alignment and mounted for independent rotation; a gear train operably associated with said shafts and having a forwardly driving part and a reversely driving part; a one-way clutch connecting said forwardly driving part and said driving shaft; and means for selectively coupling said driven shaft with said driving shaft, said forwardly driving part, or said reversely driving part.

33. The mechanism described in claim 32, wherein said means comprises an element mounted for axial movement upon said driven shaft and having at least one set of external teeth provided thereon.

34. The mechanism described in claim 32, wherein said driving shaft, said forwardly driving part and said reversely driving part are provided with teeth, and said means comprises an axially movable toothed member which is adapted to be meshed with said teeth.

35. In an automatic transmission, a driving shaft and a driven shaft mounted for rotation, said driving shaft having a gear provided on one end thereof; means for establishing a torque multiplying connection between said shafts, comprising a rotatably supported gear carrier, at least one gear journaled in said gear carrier and meshed with said driving shaft gear, said gear and gear carrier being operable to establish a direct drive between said shafts when it is coupled to one of them, and means for automatically coupling said gear carrier to said one shaft when it is rotated at a predetermined speed, comprising a centrifugally operable friction clutch, said clutch comprising a plurality of weight levers supported by said gear carrier for synchronous rotation therewith; and means for preventing said levers from effecting clutch engagement until forces of considerable magnitude are built up therein.

36. In an automatic power transmitting mechanism, a driving member adapted to be operatively coupled to a prime mover; a driven member adapted to be connected to a load; a torque multiplying mechanism; means for automatically establishing a slipping torque transmitting connection between said members to said torque multiplying mechanism when said driving member attains a predetermined speed, and for maintaining said coupling throughout a substantial speed range of said driving member, thereby allowing said prime mover to accelerate sufficiently to develop adequate torque to handle said load; and means for automatically bringing said members into synchronism when certain conditions have been attained in the mechanism, said last named means comprising a centrifugally operable friction clutch having weight levers responsive to centrifugal action for engaging the clutch; and means associated with said levers for inhibiting clutch engaging operation thereof until centrifugal forces of predetermined magnitude have been built up therein and for thereafter releasing said levers to allow them to comparatively rapidly engage said centrifugal clutch and synchronize said members with a degree of slippage which is relatively small with respect to that attending operation of said first-named means.

37. The automatic power transmitting mechanism described in claim 36, wherein said centrifugally operable friction clutch is responsive to the speed of said driven member.

JOSEPH E. PADGETT.

CERTIFICATE OF CORRECTION.

Patent No. 2,045,611. June 30, 1936

JOSEPH E. PADGETT.

It is hereby certified that error appears in the printed specification of the above numbered patent requiring correction as follows: Page 17, second column, line 68, claim 3, after the word "said" insert second; and that the said Letters Patent should be read with this correction therein that the same may conform to the record of the case in the Patent Office.

Signed and sealed this 8th day of September, A. D. 1936.

(Seal)

Leslie Frazer
Acting Commissioner of Patents